(12) United States Patent
Marttila et al.

(10) Patent No.: US 7,941,013 B2
(45) Date of Patent: May 10, 2011

(54) PROCESS FOR MAKING LIGHT GUIDES WITH EXTRACTION STRUCTURES AND LIGHT GUIDES PRODUCED THEREBY

(75) Inventors: Charles A. Marttila, Shoreview, MN (US); Charles D. Hoyle, Stillwater, MN (US); David A. Ender, New Richmond, WI (US); Jaime B. Willoughby, Hugo, MN (US); Robert J. DeVoe, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 170 days.

(21) Appl. No.: 12/299,955

(22) PCT Filed: May 17, 2007

(86) PCT No.: PCT/US2007/069095
§ 371 (c)(1),
(2), (4) Date: Nov. 7, 2008

(87) PCT Pub. No.: WO2007/137102
PCT Pub. Date: Nov. 29, 2007

(65) Prior Publication Data
US 2009/0175050 A1    Jul. 9, 2009

Related U.S. Application Data

(60) Provisional application No. 60/747,609, filed on May 18, 2006.

(51) Int. Cl.
G02B 6/26     (2006.01)
F21V 7/04     (2006.01)
F21V 7/22     (2006.01)

(52) U.S. Cl. .................. 385/31; 362/620; 362/626
(58) Field of Classification Search .................. 385/31; 362/620, 626
See application file for complete search history.

(56) References Cited

U.S. PATENT DOCUMENTS

| 3,018,262 A | 1/1962 | Schroeder |
| 3,729,313 A | 4/1973 | Smith |

(Continued)

FOREIGN PATENT DOCUMENTS

EP    0 426 0441    12/1996

(Continued)

OTHER PUBLICATIONS

U.S. Appl. No. 12/158,143, filed Dec. 20, 2006, Sykora, et al., "Method And Apparatus For Processing Multiphoton Curable Photoreactive Compositions" (related to WO2007/073482).

(Continued)

*Primary Examiner* — Jerry T Rahll
(74) *Attorney, Agent, or Firm* — Lucy C. Weiss

(57) ABSTRACT

A process comprises imagewise exposing at least a portion of a photoreactive composition to light sufficient to cause simultaneous absorption of at least two photons/thereby inducing at least one acid- or radical-initiated chemical reaction where the composition is exposed to the light, the imagewise exposing being carried out in a pattern that is effective to define at least the surface of a plurality of light extraction structures. Each one of the array of light extraction structures has at least one shape factor; the shape factor may vary across the array. At least one light extraction structure may have the geometric configuration of a truncated asphere.

25 Claims, 4 Drawing Sheets

U.S. PATENT DOCUMENTS

| | | |
|---|---|---|
| 3,741,769 A | 6/1973 | Smith |
| 3,779,778 A | 12/1973 | Smith et al. |
| 3,784,378 A | 1/1974 | Gramas |
| 3,808,006 A | 4/1974 | Smith |
| 4,250,053 A | 2/1981 | Smith |
| 4,279,717 A | 7/1981 | Eckberg et al. |
| 4,394,403 A | 7/1983 | Smith |
| 4,491,628 A | 1/1985 | Ito et al. |
| 4,642,126 A | 2/1987 | Zador et al. |
| 4,652,274 A | 3/1987 | Boettcher et al. |
| 4,859,572 A | 8/1989 | Farid et al. |
| 5,018,164 A | 5/1991 | Brewer et al. |
| 5,235,015 A | 8/1993 | Ali et al. |
| 5,254,390 A | 10/1993 | Lu |
| 5,300,263 A | 4/1994 | Hoopman et al. |
| 5,439,621 A | 8/1995 | Hoopman |
| 5,519,539 A | 5/1996 | Hoopman et al. |
| 5,545,676 A | 8/1996 | Palazzotto et al. |
| 5,593,221 A | 1/1997 | Evanicky et al. |
| 5,604,635 A | 2/1997 | Lawandy |
| 5,707,684 A | 1/1998 | Hayes et al. |
| 5,730,518 A | 3/1998 | Kashima et al. |
| 5,753,346 A | 5/1998 | Leir et al. |
| 5,770,737 A | 6/1998 | Reinhardt et al. |
| 5,856,373 A | 1/1999 | Kaisaki et al. |
| 5,859,251 A | 1/1999 | Reinhardt et al. |
| 5,896,119 A | 4/1999 | Evanicky et al. |
| 5,986,811 A | 11/1999 | Wohlstadter |
| 5,998,495 A | 12/1999 | Oxman et al. |
| 6,025,406 A | 2/2000 | Oxman et al. |
| 6,039,553 A | 3/2000 | Lundin et al. |
| 6,100,405 A | 8/2000 | Reinhardt et al. |
| 6,122,109 A | 9/2000 | Peake et al. |
| 6,157,017 A | 12/2000 | Kim |
| 6,167,182 A | 12/2000 | Shinohara et al. |
| 6,174,064 B1 * | 1/2001 | Kalantar et al. ............... 362/255 |
| 6,300,502 B1 | 10/2001 | Kannan et al. |
| 6,339,503 B1 | 1/2002 | Derstine et al. |
| 6,339,506 B1 | 1/2002 | Wakelin et al. |
| 6,347,874 B1 | 2/2002 | Boyd et al. |
| 6,379,016 B1 | 4/2002 | Boyd et al. |
| 6,425,673 B1 | 7/2002 | Suga et al. |
| 6,548,144 B1 | 4/2003 | Teshima et al. |
| 6,576,887 B2 | 6/2003 | Whitney et al. |
| 6,683,725 B2 | 1/2004 | Wohlstadter |
| 6,822,190 B2 | 11/2004 | Smithson et al. |
| 6,822,799 B2 | 11/2004 | Kitamura et al. |
| 6,835,535 B2 | 12/2004 | Gretton et al. |
| 6,852,766 B1 | 2/2005 | DeVoe |
| 6,853,490 B2 | 2/2005 | Wang et al. |
| 6,855,478 B2 | 2/2005 | DeVoe et al. |
| 7,005,229 B2 | 2/2006 | Nirmal et al. |
| 7,009,774 B2 | 3/2006 | Yoshikawa et al. |
| 7,014,988 B2 | 3/2006 | DeVoe et al. |
| 7,026,103 B2 | 4/2006 | DeVoe et al. |
| 7,031,065 B2 | 4/2006 | Uchikawa et al. |
| 7,033,736 B2 | 4/2006 | Morris et al. |
| 7,060,419 B2 | 6/2006 | Bentsen et al. |
| 7,091,255 B2 | 8/2006 | DeVoe |
| 7,092,166 B1 | 8/2006 | Wood |
| 7,166,409 B2 | 1/2007 | Fleming et al. |
| 7,209,624 B2 | 4/2007 | Reynolds et al. |
| 7,232,650 B2 | 6/2007 | Leatherdale et al. |
| 7,265,161 B2 | 9/2007 | Leatherdale et al. |
| 7,372,631 B2 | 5/2008 | Ozawa |
| 7,381,516 B2 | 6/2008 | Arney et al. |
| 7,583,444 B1 | 9/2009 | DeVoe et al. |
| 2002/0006648 A1 | 1/2002 | Goodman et al. |
| 2003/0016930 A1 | 1/2003 | Inditsky |
| 2003/0155667 A1 | 8/2003 | Devoe et al. |
| 2004/0012872 A1 | 1/2004 | Fleming et al. |
| 2004/0067451 A1 | 4/2004 | DeVoe et al. |
| 2004/0126694 A1 | 7/2004 | Devoe et al. |
| 2004/0179348 A1 | 9/2004 | Pesenti |
| 2004/0223385 A1 | 11/2004 | Fleming et al. |
| 2005/0063064 A1 | 3/2005 | Becker et al. |
| 2005/0124712 A1 | 6/2005 | Anderson et al. |
| 2005/0147918 A1 | 7/2005 | Weber et al. |
| 2006/0048498 A1 | 3/2006 | Takasaka et al. |
| 2006/0078831 A1 | 4/2006 | DeVoe et al. |
| 2006/0115214 A1 | 6/2006 | Cassarly |
| 2007/0035843 A1 | 2/2007 | Cassarly |
| 2007/0058391 A1 * | 3/2007 | Wilson et al. ............... 362/606 |
| 2007/0087284 A1 | 4/2007 | Fleming et al. |
| 2007/0207410 A1 | 9/2007 | Leatherdale et al. |
| 2007/0264501 A1 | 11/2007 | Leatherdale et al. |
| 2007/0282030 A1 | 12/2007 | Anderson et al. |

FOREIGN PATENT DOCUMENTS

| | | |
|---|---|---|
| FR | 2859543 | 3/2005 |
| JP | 03-198003 | 8/1991 |
| JP | 11-237625 | 8/1999 |
| KR | 10-2004-0090640 | 10/2004 |
| WO | WO 95/06889 | 3/1995 |
| WO | WO 98/21521 | 5/1998 |
| WO | WO 99/53242 | 10/1999 |
| WO | WO 01/96452 | 12/2001 |
| WO | WO 01/96962 | 12/2001 |
| WO | WO 2004/070438 | 8/2004 |
| WO | WO 2007/073482 | 6/2007 |
| WO | WO2007/075406 | 7/2007 |

OTHER PUBLICATIONS

U.S. Appl. No. 11/313,482, filed Dec. 21, 2005, Devoe, et al., "Process for Making Microlens Arrays and Masterforms"(related to WO2007/075406).

Chen et al., "Microjet Printing of High Precision Microlens Array for Packaging of Fiber-Optic Components", *Optoelectronic Interconnects, Integrated Circuits, and Packaging*, vol. 4652, Jun. 2002, pp. 136-141.

Croutxé-Barghorn et al. "Fabrication of Refractive Microlens Arrays by Visible Irradiation of Acrylic Monomers: Influence of Photonic Parameters", *The European Physical Journal—Applied Physics*, vol. 13, No. 1, Jan. 2001, pp. 31-37.

Daly et al., "Little Lenses, Major Markets", *Photonics Spectra*, vol. 35, Issue 7, Jul. 2001, pp. 120-122.

D. F. Eaton in *Advances in Photochemistry*, edited by B. Voman et al., vol. 13, pp. 427-488, John Wiley and Sons, New York (1986).

Hutley, M.C., "Optical Techniques for the Generation of Microlens Arrays", *Journal of Modern Optics*, vol. 37, No. 2, Feb. 1990, pp. 253-265.

Ming et al., "Fabrication of Holographic Microlenses Using a Deep Lithographed Zone Plate", *Applied Optics*, vol. 29, No. 34, Dec. 1990, pp. 5111-5114.

Moon et al., "Fabrication of a Microlens Array Using Micro-Compression Molding With an Electroformed Mold Insert", *Journal of Microengineering*, Dec. 2002.

Morey, Jennifer L., "Microlens Arrays Sharpen the Details", *Photonics Spectra*, vol. 31, Issue 12, Dec. 1997, pp. 110-114.

Morgan, B., C. Waits, J. Krizmanic, and R. Ghodssi, "Development of a Deep Silicon Phase Fresnel Lens Using Gray-Scale Lithography and Deep Reactive Ion Etching", Journal of Microelectromechanical Systems, vol. 13, No. 1, Feb. 2004, pp. 112-120.

Oder, T.N. et al., "Nitride Microlens Arrays for Blue and Ultraviolet Wavelength Applications", *Applied Physics Letters*, vol. 82, No. 21, May 2003.

Oikawa, M. et al., "High Numerical Aperture Planar Microlens with Swelled Structure", *Applied Optics*, vol. 29, No. 28, Oct. 1990.

*OMRON Electronic Components Web*, Product Principles, http://www.omron.co.jp/ecb/products/bklight/english/genri/index.html, Apr. 3, 2007, pp. 1-2.

Steenblik, Richard A., and Hurt, Mark J., "Unison™ Micro-optic Security Film", *Proceedings of SPIE*, vol. 5310, Jun. 2004.

Totsu, K., K. Fujishiro, S. Tanaka, and M. Esashi, "Gray-Scale Lithography using Mask-Less Exposure System", The 13th International Conference on Solid-State Sensors, Actuators and Microsystems, Seoul, Korea, Jun. 5-9, 2005.

Waits, C., R. Ghodssi, M. Ervin, and M. Dubey, "MEMS-based Gray-Scale Lithography", Semiconductor Device Research Symposium, 2001 International, (2001), pp. 182-185.

N. L. Weinburg, Ed., Technique of Electroorganic Synthesis Part II Techniques of Chemistry, vol. V (1975).

Whitaker et al., "Microfabrication of Graded Index Lenses Using Two Photon Induced Polymerization", *Lasers and Electro-Optics*, Jun. 2003, pp. 973-975.

Allen, R.D., et al., "High Performance Acrylic Polymers for Chemically Amplified Photoresist Applications," J. Vac. Sci. Technol. B, 9, 3357 (Nov./Dec. 1991).

Allen, R.D., et al., "Advances in Resist Technology and Processing XII" "193nm Single Layer Positive Resists Building Etch Resistance Into a High Resolution Imaging System", Proc. SPIE, vol. 2438, pp. 474-485 (Feb. 1995).

Beringer et al., "Diaryliodonium Salts. IX. The Synthesis of Substituted Diphenyliodonium Salts", J. Am. Chem. Soc., vol. 81, pp. 342-351 (Jan. 1959).

Beuret, C., et al. "Microfabrication of 3D Multidirectional Inclined Structures by UV Lithography and Electroplating", Proc. IEEE Micro Electro Mechanical Syst. MEMS, OISO, Japan, pp. 81-85 (1994; the year of publication is sufficiently earlier than the effective U.S. filing date and any foreign priority date that the month of publication is not an issue).

Cox, R. J., *Photographic Sensitivity*, Chapter 15, Academic Press (1973; the year of publication is sufficiently earlier than the effective U.S. filing date and any foreign priority date that the month of publication is not an issue).

Croutxé-Barghorn et al., "Fabrication of Microlenses by Direct Photo-Induced Crosslinking Polymerization", Applied Surface Science, pp. 89-91, (2000; the year of publication is sufficiently earlier than the effective U.S. filing date and any foreign priority date that the month of publication is not an issue).

Henke, W., et al., "Simulation and experimental study of gray-tone lithography for the fabrication of arbitrarily shaped surfaces", Proc. IEEE Micro Electro Mechanical Syst. MEMS 994, OISO, Japan, pp. 205-210 (1994; the year of publication is sufficiently earlier than the effective U.S. filing date and any foreign priority date that the month of publication is not an issue).

*Handbook of Epoxy Resins*, Lee and Neville, McGraw-Hill Book Co., New York (1967; the year of publication is sufficiently earlier than the effective U.S. filing date and any foreign priority date that the month of publication is not an issue).

Lens (Optics), *McGraw-Hill Encyclopedia of Science and Technology*, 6$^{th}$ Edition (1987; the year of publication is sufficiently earlier than the effective U.S. filing date and any foreign priority date that the month of publication is not an issue).

Mann, C.K., et al., *Electrochemical Reactions in Nonaqueous Systems* (1970; the year of publication is sufficiently earlier than the effective U.S. filing date and any foreign priority date that the month of publication is not an issue).

Xu, C., et al., "Measurement of two-photon excitation cross sections of molecular fluorophores with data from 690 to 1050nm", J. Opt. Soc. Am. B, vol. 13, pp. 481-491 (Mar. 1996).

Zhou, W., et al., "An Efficient Two-Photon-Generated Photoacid Applied to Positive-Tone 3D Microfabrication", SCIENCE, vol. 296, pp. 1106-1109 (May 2002).

International Search Report for International Application No. PCT/US2007/069095.

* cited by examiner

PROCESS FOR MAKING LIGHT GUIDES WITH EXTRACTION STRUCTURES AND LIGHT GUIDES PRODUCED THEREBY

STATEMENT OF PRIORITY

This application claims the priority of U.S. Provisional Application No. 60/747,609 filed May 18, 2006, the contents of which are hereby incorporated by reference.

FIELD

This invention relates to processes for making light extraction structures, light extraction structure arrays, and/or light extraction structure array masterforms and, in other aspects, to light extraction structures, light extraction structure arrays, and/or light extraction structure array masterforms made thereby. This invention further relates to light guides comprising the light extraction structure arrays and to articles comprising the light guides.

BACKGROUND

A variety of devices have been proposed for illuminating electronic displays and keypads. These devices include backlighting panels, front lighting panels, concentrators, reflectors, structured-surface films, and other optical devices for redirecting, collimating, distributing, or otherwise manipulating light. Passive optical components (for example, lenses, prisms, mirrors, and light extraction structures) are well-known and are used in optical systems to collect, distribute, or modify optical radiation.

Efficient use of light is particularly important in battery powered electronic displays and keypads such as those used in cell phones, personal digital assistants, and laptop computers. By improving lighting efficiency, battery life can be increased and/or battery sizes can be reduced. Prismatic films are commonly used to improve lighting efficiency and enhance the apparent brightness of a backlit liquid crystal display, and multiple light sources (for example, light emitting diodes (LEDs)) are commonly used for this purpose in keypads.

Lighting quality is also an important consideration in electronic displays and keypads. One measure of lighting quality for a backlit display or keypad is brightness uniformity. Because displays (and, to a somewhat lesser extent, keypads) are typically studied closely or used for extended periods of time, relatively small differences in the brightness can easily be perceived. These types of variances in brightness can be distracting or annoying to a user. To soften or mask non-uniformities, a light scattering element (for example, a diffuser) can sometimes be used. However, such scattering elements can negatively affect the overall brightness of a display or keypad.

Multiple light sources can alternatively be used to achieve brightness uniformity, but this approach has the associated disadvantage of reduced battery life. Thus, there has been some attention to the development of various means of effectively distributing the light from a more limited number of light sources, including the development of light guides comprising a plurality of light extraction structures. Such light extraction structures, as well as light extraction structure arrays, have been made by a number of different techniques, each having a different set of strengths and weaknesses.

SUMMARY

Thus, we recognize that there is a need for processes that can be used to fabricate light guides that can meet the quality, cost, and/or performance requirements of a variety of different applications. In particular, we recognize a need for processes that are capable of producing light extraction structures and light extraction structure arrays that can be used to provide efficient light guides enabling brightness uniformity and long battery life (or reduced battery size).

Briefly, in one aspect, this invention provides a process for making a light extraction structure array or a light extraction structure array masterform. The process comprises providing a photoreactive composition, the photoreactive composition comprising (a) at least one reactive species that is capable of undergoing an acid- or radical-initiated chemical reaction, and (b) at least one multiphoton photoinitiator system. The reactive species is preferably a curable species (more preferably, a curable species selected from the group consisting of monomers, oligomers, and reactive polymers). At least a portion of the composition can be imagewise exposed to light sufficient to cause simultaneous absorption of at least two photons, thereby inducing at least one acid- or radical-initiated chemical reaction where the composition is exposed to the light.

The imagewise exposing can be carried out in a pattern that is effective to define at least the surface of an array of light extraction structures, each of the light extraction structures having at least one shape factor, and the array of light extraction structures having a distribution that can be uniform or non-uniform. Generally, the distribution can be non-uniform and/or the shape factor of at least one light extraction structure can be different from that of at least one other light extraction structure.

The composition can, optionally, be developed by removing the resulting exposed portion, or the resulting non-exposed portion, of the composition. Optionally, after imagewise exposing at least a portion of the composition, at least a portion of the composition can be nonimagewise exposed to light sufficient to effect reaction of at least a portion of any remaining unreacted photoreactive composition.

Preferably, the distribution of the array is non-uniform, and at least one shape factor (preferably, height) varies at least somewhat (preferably, regularly) across (or as a function of position within) the array of light extraction structures. Shape factors can be said to be different when the height (or another dimension) and/or the geometric configuration of at least one light extraction structure is different from that of at least one other light extraction structure in the array. Geometric configurations can be said to be different when two light extraction structures in the array cannot be scaled to be superimposable. Preferably, the areal density of the array of light extraction structures varies across the array and/or at least one shape factor varies across the array (more preferably, both areal density and at least one shape factor vary across the array: even more preferably, both areal density and height vary across the array; most preferably, areal density increases as the height of the light extraction structures increases across the array).

It has been discovered that multiphoton photofabrication processes can be well-suited for fabricating light extraction structure arrays having varying optical properties (for example, arrays exhibiting a spatial variation of light extraction). Surprisingly, the process of the invention can provide flexibility and control in producing a variety of individual light extraction structure profiles in a single array, yet can be used to achieve desirably low levels of average surface roughness while maintaining industrially acceptable fabrication speeds or "throughput." Such flexibility and control can also facilitate the production of arrays of varying fill factor and/or varying degrees of distribution uniformity.

The process of the invention involves the use of relatively low-cost materials (for example, polymers) and is capable of relatively easy integration into the fabrication processes used in the manufacture of optoelectronic devices. The process also enables cost-effective replication (for example, through the production of masterforms). Furthermore, the process is capable of flexibly and controllably producing light extraction structures of various different geometric configurations and heights (that is, different shape factors) and arrays of various different symmetries (or asymmetries) and fill factors, each such type of light extraction structure and light extraction structure array thereby having different, controlled optical properties.

Thus, at least some embodiments of the process of the invention meet the above-stated need for light extraction structure array fabrication processes that can satisfy the quality, cost, and/or performance requirements of a variety of different applications and also, in particular, provide efficient light guides enabling brightness uniformity and long battery life (or reduced battery size). Light extraction structure arrays made by the process of the invention can be suitable for use in numerous optical applications including, for example, in backlit displays and backlit keypads.

In other aspects, this invention also provides:

a light extraction structure array comprising a plurality of light extraction structures having a non-uniform distribution, each of the light extraction structures having a principal axis and at least one shape factor, and the plurality of light extraction structures exhibiting a variation in areal density, in at least one shape factor, and in principal axis across the plurality of light extraction structures;

a light extraction structure array comprising a plurality of light extraction structures having a non-uniform distribution, each of the light extraction structures having a geometric configuration, and the geometric configuration of at least one of the light extraction structures being a truncated asphere;

light guides comprising the arrays; and optical devices (for example, a backlit display or a backlit keypad) comprising the light guides.

BRIEF DESCRIPTION OF DRAWING

These and other features, aspects, and advantages of the present invention will become better understood with regard to the following description, appended claims, and accompanying drawing, wherein:

FIG. 3a shows a light extraction structure 10 having an aspheric geometric configuration 12;

FIG. 3b shows a light extraction structure 10 having a truncated aspheric geometric configuration 14;

FIG. 3c shows a light extraction structure 10 having a conic geometric configuration 16; and FIG. 3d shows a light extraction structure 10 having a truncated conic geometric configuration 18.

FIG. 4a shows a light guide 30 comprising an array 20 having a non-uniform distribution of light extraction structures 10.

FIG. 4b shows a light guide 30 comprising an array 20 having a uniform distribution of light extraction structures 10.

Figure 1:
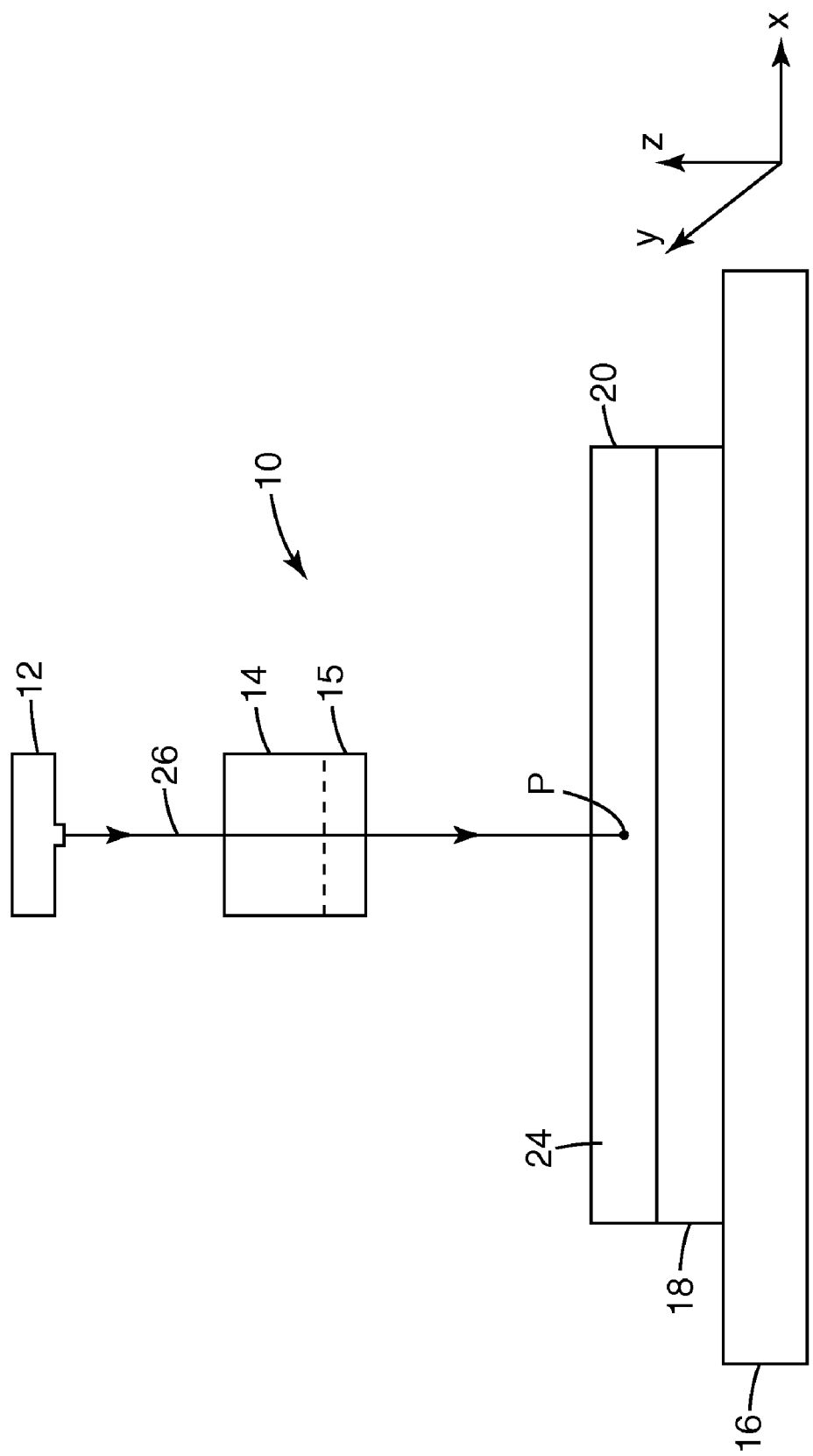
FIG. 1 is a schematic representation of an exemplary multiphoton photofabrication system useful for carrying out the process of the invention.

These figures, which are idealized, are not drawn to scale and are intended to be merely illustrative and nonlimiting.

DETAILED DESCRIPTION

Definitions

As used in this patent application:

"average surface roughness" means the average deviation between the actual surface profile of a light extraction structure and its average surface profile;

"cure" means to effect polymerization and/or to effect crosslinking;

"electronic excited state" means an electronic state of a molecule that is higher in energy than the molecule's electronic ground state, that is accessible via absorption of electromagnetic radiation, and that has a lifetime greater than $10^{-13}$ seconds;

"exposure system" means an optical system plus a light source;

"fill factor" (in regard to a light extraction structure array) means the portion or percentage of the area of the array that modifies incident actinic radiation;

"light extraction structure" means a microstructure (having a length, width, and height of at least about one micrometer) that is capable of directing or distributing light (for example, a protruding or recessed microstructure that distributes light within and/or directs light from a light guide);

"masterform" means an originally-fabricated article that can be used to manufacture a tool for replication;

"multiphoton absorption" means simultaneous absorption of two or more photons to reach a reactive, electronic excited state that is energetically inaccessible by the absorption of a single photon of the same energy;

"optical system" means a system for controlling light, the system including at least one element chosen from refractive optical elements such as lenses, reflective optical elements such as mirrors, and diffractive optical elements such as gratings. Optical elements shall also include diffusers, waveguides, and other elements known in the optical arts;

"photochemically effective amounts" (of the components of the photoinitiator system) means amounts sufficient to enable the reactive species to undergo at least partial reaction under the selected exposure conditions (as evidenced, for example, by a change in density, viscosity, color, pH, refractive index, or other physical or chemical property);

"photosensitizer" means a molecule that lowers the energy required to activate a photoinitiator by absorbing light of lower energy than is required by the photoinitiator for activation and interacting with the photoinitiator to produce a photoinitiating species therefrom;

"shape factor" (in regard to a light extraction structure) means a dimension (length, width, or height) or the geometric configuration of the structure; and "simultaneous" means two events that occur within the period of $10^{-14}$ seconds or less;

"sufficient light" means light of sufficient intensity and appropriate wavelength to effect multiphoton absorption; and "three-dimensional light pattern" means an optical image wherein the light energy distribution resides in a volume or in multiple planes and not in a single plane.

Reactive Species

Reactive species suitable for use in the photoreactive compositions include both curable and non-curable species. Curable species are generally preferred and include, for example, addition-polymerizable monomers and oligomers and addition-crosslinkable polymers (such as free-radically polymerizable or crosslinkable ethylenically-unsaturated species including, for example, acrylates, methacrylates, and certain vinyl compounds such as styrenes), as well as cationically-polymerizable monomers and oligomers and cationically-crosslinkable polymers (which species are most commonly acid-initiated and which include, for example, epoxies, vinyl ethers, cyanate esters, etc.), and the like, and mixtures thereof.

Suitable ethylenically-unsaturated species are described, for example, by Palazzotto et al. in U.S. Pat. No. 5,545,676 at column 1, line 65, through column 2, line 26, and include mono-, di-, and poly-acrylates and methacrylates (for example, methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p -ethoxyphenyldimethylmethane, bis [1-(3-acryloxy-2-hydroxy)]-p-propoxyphenyldimethyl-methane, trishydroxyethyl-isocyanurate trimethacrylate, the bis-acrylates and bis-methacrylates of polyethylene glycols of molecular weight about 200-500, copolymerizable mixtures of acrylated monomers such as those of U.S. Pat. No. 4,652,274, and acrylated oligomers such as those of U.S. Pat. No. 4,642,126); unsaturated amides (for example, methylene bis-acrylamide, methylene bis-methacrylamide, 1,6-hexamethylene bis-acrylamide, diethylene triamine tris-acrylamide and beta-methacrylaminoethyl methacrylate); vinyl compounds (for example, styrene, diallyl phthalate, divinyl succinate, divinyl adipate, and divinyl phthalate); and the like; and mixtures thereof. Suitable reactive polymers include polymers with pendant (meth)acrylate groups, for example, having from 1 to about 50 (meth)acrylate groups per polymer chain. Examples of such polymers include aromatic acid (meth)acrylate half ester resins such as Sarbox™ resins available from Sartomer (for example, Sarbox™ 400, 401, 402, 404, and 405). Other useful reactive polymers curable by free radical chemistry include those polymers that have a hydrocarbyl backbone and pendant peptide groups with free-radically polymerizable functionality attached thereto, such as those described in U.S. Pat. No. 5,235,015 (Ali et al.). Mixtures of two or more monomers, oligomers, and/or reactive polymers can be used if desired. Preferred ethylenically-unsaturated species include acrylates, aromatic acid (meth) acrylate half ester resins, and polymers that have a hydrocarbyl backbone and pendant peptide groups with free-radically polymerizable functionality attached thereto.

Suitable cationically-reactive species are described, for example, by Oxman et al. in U.S. Pat. Nos. 5,998,495 and 6,025,406 and include epoxy resins. Such materials, broadly called epoxides, include monomeric epoxy compounds and epoxides of the polymeric type and can be aliphatic, alicyclic, aromatic, or heterocyclic. These materials generally have, on the average, at least 1 polymerizable epoxy group per molecule (preferably, at least about 1.5 and, more preferably, at least about 2). The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendant epoxy groups (for example, a glycidyl methacrylate polymer or copolymer). The epoxides can be pure compounds or can be mixtures of compounds containing one, two, or more epoxy groups per molecule. These epoxy-containing materials can vary greatly in the nature of their backbone and substituent groups. For example, the backbone can be of any type and substituent groups thereon can be any group that does not substantially interfere with cationic cure at room temperature. Illustrative of permissible substituent groups include halogens, ester groups, ethers, sulfonate groups, siloxane groups, nitro groups, phosphate groups, and the like. The molecular weight of the epoxy-containing materials can vary from about 58 to about 100,000 or more.

Other epoxy-containing materials that are useful include glycidyl ether monomers of the formula

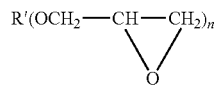

where R' is alkyl or aryl and n is an integer of 1 to 8. Examples are glycidyl ethers of polyhydric phenols obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in *Handbook of Epoxy Resins*, Lee and Neville, McGraw-Hill Book Co., New York (1967).

A number of commercially available epoxy monomers or resins can be used. Epoxides that are readily available include, but are not limited to, octadecylene oxide; epichlorohydrin; styrene oxide; vinylcyclohexene oxide; glycidol; glycidyl methacrylate; diglycidyl ethers of bisphenol A (for example, those available under the trade designations "EPON 815C", "EPON 813", "EPON 828", "EPON 1004F", and "EPON 1001F" from Hexion Specialty Chemicals, Inc., Columbus, Ohio); and diglycidyl ether of bisphenol F (for example, those available under the trade designations "ARALDITE GY281" from Ciba Specialty Chemicals Holding Company, Basel, Switzerland, and "EPON 862" from Hexion Specialty Chemicals, Inc.). Other aromatic epoxy resins include the SU-8 resins available from MicroChem. Corp., Newton, Mass.

Other exemplary epoxy monomers include vinyl cyclohexene dioxide (available from SPI Supplies, West Chester, Pa.); 4-vinyl-1-cylcohexene diepoxide (available from Aldrich Chemical Co., Milwaukee, Wis.); 3,4-epoxycyclohexylmethyl-3,4-epoxycyclohexene carboxylate (for example, one available under the trade designation "CYRACURE UVR-6110" from Dow Chemical Co., Midland, Mich.); 3,4-epoxy-6-methylcylcohexylmethyl-3,4-epoxy-6-methyl-cylcohexane carboxylate; 2-(3,4-epoxycyclohexyl-5,5-spiro-3,4-epoxy)cyclohexane-metadioxane; bis(3,4-epoxycyclohexylmethyl) adipate (for example, one available under the trade designation "CYRACURE UVR-6128" from Dow Chemical Co.); bis(3,4-epoxy-6-methylclyclohexylmethyl)adipate; 3,4-epoxy-6-methylcyclohexane carboxylate; and dipentene dioxide.

Still other exemplary epoxy resins include epoxidized polybutadiene (for example, one available under the trade designation "POLY BD 605E" from Sartomer Co., Inc., Exton, Pa.); epoxy silanes (for example, 3,4-epoxycylclohexylethyltrimethoxysilane and 3-glycidoxypropyltrimethoxysilane, commercially available from Aldrich Chemical Co., Milwaukee, Wis.); flame retardant epoxy monomers (for example, one available under the trade designation "DER-542", a brominated bisphenol type epoxy monomer available from Dow Chemical Co., Midland, Mich.); 1,4-butanediol diglycidyl ether (for example, one available under the trade designation "ARALDITE RD-2" from Ciba Specialty Chemicals); hydrogenated bisphenol A-epichlorohydrin based epoxy monomers (for example, one available under the trade designation "EPONEX 1510" from Hexion Specialty Chemicals, Inc.); polyglycidyl ether of phenol-formaldehyde novolak (for example, one available under the trade designation "DEN-431" and "DEN-438" from Dow Chemical Co.); and epoxidized vegetable oils such as epoxidized linseed and soybean oils available under the trade designations "VIKOLOX" and "VIKOFLEX" from Atofina Chemicals (Philadelphia, Pa.).

Additional suitable epoxy resins include alkyl glycidyl ethers commercially available from Hexion Specialty Chemicals, Inc. (Columbus, Ohio) under the trade designation "HELOXY". Exemplary monomers include "HELOXY MODFIER 7" (a $C_8$-$C_{10}$ alky glycidyl ether), "HELOXY MODIFIER 8" (a $C_{12}$-$C_{14}$ alkyl glycidyl ether), "HELOXY MODIFIER 61" (butyl glycidyl ether), "HELOXY MODIFER 62" (cresyl glycidyl ether), "HELOXY MODIFER 65" (p-tert-butylphenyl glycidyl ether), "HELOXY MODIFER 67" (diglycidyl ether of 1,4-butanediol), "HELOXY 68" (diglycidyl ether of neopentyl glycol), "HELOXY MODIFER 107" (diglycidyl ether of cyclohexanedimethanol), "HELOXY MODIFER 44" (trimethylol ethane triglycidyl ether), "HELOXY MODIFER 48" (trimethylol propane triglycidyl ether), "HELOXY MODIFER 84" (polyglycidyl ether of an aliphatic polyol), and "HELOXY MODIFER 32" (polyglycol diepoxide).

Other useful epoxy resins comprise copolymers of acrylic acid esters of glycidol (such as glycidyl acrylate and glycidyl methacrylate) with one or more copolymerizable vinyl compounds. Examples of such copolymers are 1:1 styrene-glycidyl methacrylate and 1:1 methyl methacrylate-glycidyl acrylate. Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate).

Useful epoxy-functional polymers include epoxy-functional silicones such as those described in U.S. Pat. No. 4,279, 717 (Eckberg et al.), which are commercially available from the General Electric Company. These are polydimethylsiloxanes in which 1-20 mole % of the silicon atoms have been substituted with epoxyalkyl groups (preferably, epoxy cyclohexylethyl, as described in U.S. Pat. No. 5,753,346 (Leir et al.).

Blends of various epoxy-containing materials can also be utilized. Such blends can comprise two or more weight average molecular weight distributions of epoxy-containing compounds (such as low molecular weight (below 200), intermediate molecular weight (about 200 to 1000), and higher molecular weight (above about 1000)). Alternatively or additionally, the epoxy resin can contain a blend of epoxy-containing materials having different chemical natures (such as aliphatic and aromatic) or functionalities (such as polar and non-polar). Other cationically-reactive polymers (such as vinyl ethers and the like) can additionally be incorporated, if desired.

Preferred epoxies include aromatic glycidyl epoxies (for example, the EPON resins available from Hexion Specialty Chemicals, Inc. and the SU-8 resins available from Micro-Chem. Corp., Newton, Mass., including XP KMPR 1050 strippable SU-8), and the like, and mixtures thereof. More preferred are the SU-8 resins and mixtures thereof.

Suitable cationally-reactive species also include vinyl ether monomers, oligomers, and reactive polymers (for example, methyl vinyl ether, ethyl vinyl ether, tert-butyl vinyl ether, isobutyl vinyl ether, triethyleneglycol divinyl ether (RAPI-CURE DVE-3, available from International Specialty Products, Wayne, N.J.), trimethylolpropane trivinyl ether, and the VECTOMER divinyl ether resins from Morflex, Inc., Greensboro, N.C. (for example, VECTOMER 1312, VECTOMER 4010, VECTOMER 4051, and VECTOMER 4060 and their equivalents available from other manufacturers)), and mixtures thereof. Blends (in any proportion) of one or more vinyl ether resins and/or one or more epoxy resins can also be utilized. Polyhydroxy-functional materials (such as those described, for example, in U.S. Pat. No. 5,856,373 (Kaisaki et al.)) can also be utilized in combination with epoxy- and/or vinyl ether-functional materials.

Non-curable species include, for example, reactive polymers whose solubility can be increased upon acid- or radical-induced reaction. Such reactive polymers include, for example, aqueous insoluble polymers bearing ester groups that can be converted by photogenerated acid to aqueous soluble acid groups (for example, poly(4-tert-butoxycarbonyloxystyrene). Non-curable species also include the chemically-amplified photoresists described by R. D. Allen, G. M. Wallraff, W. D. Hinsberg, and L. L. Simpson in "High Performance Acrylic Polymers for Chemically Amplified Photoresist Applications," J. Vac. Sci. Technol. B, 9, 3357 (1991). The chemically-amplified photoresist concept is now widely used for microchip manufacturing, especially with sub-0.5 micron (or even sub-0.2 micron) features. In such photoresist systems, catalytic species (typically hydrogen ions) can be generated by irradiation, which induces a cascade of chemical reactions. This cascade occurs when hydrogen ions initiate reactions that generate more hydrogen ions or other acidic species, thereby amplifying reaction rate. Examples of typical acid-catalyzed chemically-amplified photoresist systems include deprotection (for example, t-butoxycarbonyloxystyrene resists as described in U.S. Pat. No. 4,491,628, tetrahydropyran (THP) methacrylate-based materials, THP-phenolic materials such as those described in U.S. Pat. No. 3,779, 778, t-butyl methacrylate-based materials such as those described by R. D Allen et al. in Proc. SPIE 2438, 474 (1995), and the like); depolymerization (for example, polyphthalaldehyde-based materials); and rearrangement (for example, materials based on the pinacol rearrangements).

If desired, mixtures of different types of reactive species can be utilized in the photoreactive compositions. For example, mixtures of free-radically-reactive species and cationically-reactive species are also useful.

Photoinitiator System

The photoinitiator system is a multiphoton photoinitiator system, as the use of such a system enables polymerization to be confined or limited to the focal region of a focused beam of light. Such a system preferably is a two- or three-component system that comprises at least one multiphoton photosensitizer, at least one photoinitiator (or electron acceptor), and, optionally, at least one electron donor. Such multi-component systems can provide enhanced sensitivity, enabling photoreaction to be effected in a shorter period of time and thereby reducing the likelihood of problems due to movement of the sample and/or one or more components of the exposure system.

Preferably, the multiphoton photoinitiator system comprises photochemically effective amounts of (a) at least one multiphoton photosensitizer that is capable of simultaneously absorbing at least two photons and that, optionally but preferably, has a two-photon absorption cross-section greater than that of fluorescein; (b) optionally, at least one electron donor compound different from the multiphoton photosensitizer and capable of donating an electron to an electronic excited state of the photosensitizer; and (c) at least one photoinitiator that is capable of being photosensitized by accepting an electron from an electronic excited state of the photosensitizer, resulting in the formation of at least one free radical and/or acid.

Alternatively, the multiphoton photoinitiator system can be a one-component system that comprises at least one photoinitiator. Photoinitiators useful as one-component multi-photon photoinitiator systems include acyl phosphine oxides (for example, those sold by Ciba under the trade name Irgacure™ 819, as well as 2,4,6 trimethyl benzoyl ethoxyphenyl phosphine oxide sold by BASF Corporation under the trade name Lucirin™ TPO-L) and stilbene derivatives with covalently attached sulfonium salt moeties (for example, those described by W. Zhou et al. in Science 296, 1106 (2002)). Other conventional ultraviolet (UV) photoinitiators such as benzil ketal can also be utilized, although their multi-photon photoinitiation sensitivities will generally be relatively low.

Multiphoton photosensitizers, electron donors, and photoinitiators (or electron acceptors) useful in two- and three-component multiphoton photoinitiator systems are described below.

(1) Multiphoton Photosensitizers

Multiphoton photosensitizers suitable for use in the multiphoton photoinitiator system of the photoreactive compositions are those that are capable of simultaneously absorbing at least two photons when exposed to sufficient light. Preferably, the photosensitizers have a two-photon absorption cross-section greater than that of fluorescein (that is, greater than that of 3',6'-dihydroxyspiro[isobenzofuran-1(3H), 9'-[9H]xanthen]3-one). Generally, the preferred cross-section can be greater than about $50 \times 10^{-50}$ cm$^4$ sec/photon, as measured by the method described by C. Xu and W. W. Webb in J. Opt. Soc. Am. B, 13, 481 (1996) (which is referenced by Marder and Perry et al. in International Publication No. WO 98/21521 at page 85, lines 18-22).

More preferably, the two-photon absorption cross-section of the photosensitizer is greater than about 1.5 times that of fluorescein (or, alternatively, greater than about $75 \times 10^{-50}$ cm$^4$ sec/photon, as measured by the above method); even more preferably, greater than about twice that of fluorescein (or, alternatively, greater than about $100 \times 10^{-50}$ cm$^4$ sec/photon); most preferably, greater than about three times that of fluorescein (or, alternatively, greater than about $150 \times 10^{-50}$ cm$^4$ sec/photon); and optimally, greater than about four times that of fluorescein (or, alternatively, greater than about $200 \times 10^{-50}$ cm$^4$ sec/photon).

Preferably, the photosensitizer is soluble in the reactive species (if the reactive species is liquid) or is compatible with the reactive species and with any binders (as described below) that are included in the composition. Most preferably, the photosensitizer is also capable of sensitizing 2-methyl-4,6-bis(trichloromethyl)-s-triazine under continuous irradiation in a wavelength range that overlaps the single photon absorption spectrum of the photosensitizer (single photon absorption conditions), using the test procedure described in U.S. Pat. No. 3,729,313.

Preferably, a photosensitizer can also be selected based in part upon shelf stability considerations. Accordingly, selection of a particular photosensitizer can depend to some extent upon the particular reactive species utilized (as well as upon the choices of electron donor compound and/or photoinitiator).

Particularly preferred multiphoton photosensitizers include those exhibiting large multiphoton absorption cross-sections, such as Rhodamine B (that is, N-[9-(2-carboxyphenyl)-6-(diethylamino)-3H-xanthen-3-ylidene]-N-ethylethanaminium chloride or hexafluoroantimonate) and the four classes of photosensitizers described, for example, by Marder and Perry et al. in International Patent Publication Nos. WO 98/21521 and WO 99/53242. The four classes can be described as follows: (a) molecules in which two donors are connected to a conjugated π (pi)-electron bridge; (b) molecules in which two donors are connected to a conjugated π (pi)-electron bridge which is substituted with one or more electron accepting groups; (c) molecules in which two acceptors are connected to a conjugated π (pi)-electron bridge; and (d) molecules in which two acceptors are connected to a conjugated π (pi)-electron bridge which is substituted with one or more electron donating groups (where "bridge" means a molecular fragment that connects two or more chemical groups, "donor" means an atom or group of atoms with a low ionization potential that can be bonded to a conjugated π (pi)-electron bridge, and "acceptor" means an atom or group of atoms with a high electron affinity that can be bonded to a conjugated π (pi)-electron bridge).

The four above-described classes of photosensitizers can be prepared by reacting aldehydes with ylides under standard Wittig conditions or by using the McMurray reaction, as detailed in International Patent Publication No. WO 98/21521.

Other compounds are described by Reinhardt et al. (for example, in U.S. Pat. Nos. 6,100,405, 5,859,251, and 5,770,737) as having large multiphoton absorption cross-sections, although these cross-sections were determined by a method other than that described above.

Preferred photosensitizers include the following compounds (and mixtures thereof):

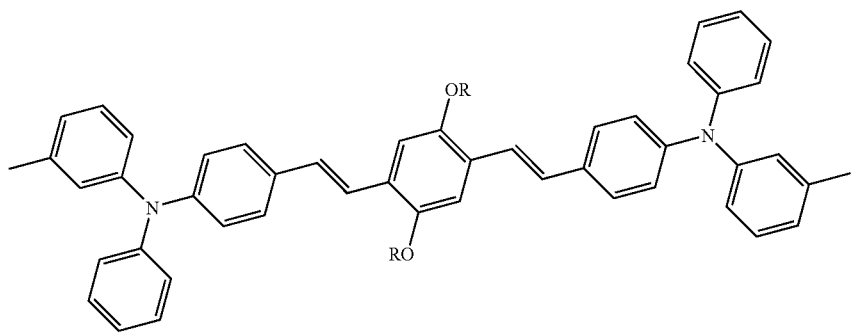

R = C$_{12}$H$_{25}$

-continued

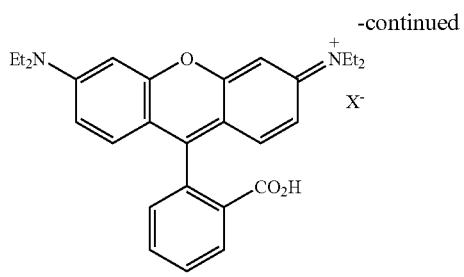

where X⁻ = Cl⁻, $PF_6^-$, $SbF_6^-$, $AsF_6^-$, $BF_4^-$, $CF_3SO_3^-$

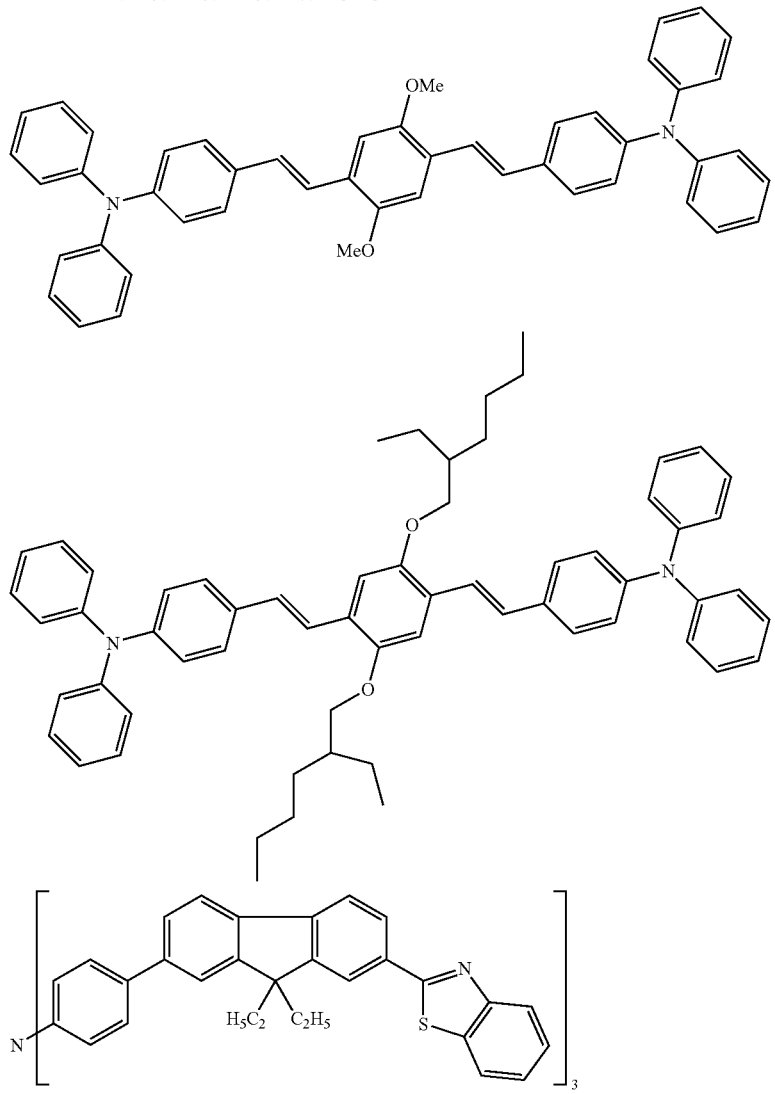

(2) Electron Donor Compounds

Electron donor compounds useful in the multiphoton photoinitiator system of the photoreactive compositions are those compounds (other than the photosensitizer itself) that are capable of donating an electron to an electronic excited state of the photosensitizer. Such compounds may be used, optionally, to increase the multiphoton photosensitivity of the photoinitiator system, thereby reducing the exposure required to effect photoreaction of the photoreactive composition. The electron donor compounds preferably have an oxidation potential that is greater than zero and less than or equal to that of p-dimethoxybenzene. Preferably, the oxidation potential is between about 0.3 and 1 volt vs. a standard saturated calomel electrode ("S.C.E.").

The electron donor compound is also preferably soluble in the reactive species and is selected based in part upon shelf stability considerations (as described above). Suitable donors are generally capable of increasing the speed of cure or the image density of a photoreactive composition upon exposure to light of the desired wavelength.

When working with cationically-reactive species, those skilled in the art will recognize that the electron donor compound, if of significant basicity, can adversely affect the cationic reaction. (See, for example, the discussion in U.S. Pat. No. 6,025,406 (Oxman et al.) at column 7, line 62, through column 8, line 49.)

In general, electron donor compounds suitable for use with particular photosensitizers and photoinitiators can be selected by comparing the oxidation and reduction potentials of the three components (as described, for example, in U.S. Pat. No. 4,859,572 (Farid et al.)). Such potentials can be measured experimentally (for example, by the methods described by R. J. Cox, *Photographic Sensitivity*, Chapter 15, Academic Press (1973)) or can be obtained from references such as N. L. Weinburg, Ed., *Technique of Electroorganic Synthesis Part II Techniques of Chemistry*, Vol. V (1975), and C. K. Mann and K. K. Barnes, *Electrochemical Reactions in Nonaqueous Systems* (1970). The potentials reflect relative energy relationships and can be used to guide electron donor compound selection.

Suitable electron donor compounds include, for example, those described by D. F. Eaton in *Advances in Photochemistry*, edited by B. Voman et al., Volume 13, pp. 427-488, John Wiley and Sons, New York (1986); by Oxman et al. in U.S. Pat. No. 6,025,406 at column 7, lines 42-61; and by Palazzotto et al. in U.S. Pat. No. 5,545,676 at column 4, line 14 through column 5, line 18. Such electron donor compounds include amines (including triethanolamine, hydrazine, 1,4-diazabicyclo[2.2.2]octane, triphenylamine (and its triphenylphosphine and triphenylarsine analogs), aminoaldehydes, and aminosilanes), amides (including phosphoramides), ethers (including thioethers), ureas (including thioureas), sulfinic acids and their salts, salts of ferrocyanide, ascorbic acid and its salts, dithiocarbamic acid and its salts, salts of xanthates, salts of ethylene diamine tetraacetic acid, salts of $(alkyl)_n(aryl)_m$ borates (n+m=4) (tetraalkylammonium salts preferred), various organometallic compounds such as $SnR_4$ compounds (where each R is independently chosen from among alkyl, aralkyl (particularly, benzyl), aryl, and alkaryl groups) (for example, such compounds as $n-C_3H_7Sn(CH_3)_3$, $(allyl)Sn(CH_3)_3$, and $(benzyl)Sn(n-C_3H_7)_3$), ferrocene, and the like, and mixtures thereof. The electron donor compound can be unsubstituted or can be substituted with one or more non-interfering substituents. Particularly preferred electron donor compounds contain an electron donor atom (such as a nitrogen, oxygen, phosphorus, or sulfur atom) and an abstractable hydrogen atom bonded to a carbon or silicon atom alpha to the electron donor atom.

Preferred amine electron donor compounds include alkyl-, aryl-, alkaryl- and aralkyl-amines (for example, methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethyl-aminophenethanol and p-N-dimethylaminobenzonitrile); aminoaldehydes (for example, p-N,N-dimethylaminobenzaldehyde, p-N,N-diethylaminobenzaldehyde, 9-julolidine carboxaldehyde, and 4-morpholinobenzaldehyde); and aminosilanes (for example, trimethylsilylmorpholine, trimethylsilylpiperidine, bis(dimethylamino)diphenylsilane, tris(dimethylamino)methylsilane, N,N-diethylaminotrimethylsilane, tris(dimethylamino)phenylsilane, tris(methylsilyl)amine, tris(dimethylsilyl)amine, bis(dimethylsilyl)amine, N,N-bis(dimethylsilyl)aniline, N-phenyl-N-dimethylsilylaniline, and N,N-dimethyl-N-dimethylsilylamine); and mixtures thereof. Tertiary aromatic alkylamines, particularly those having at least one electron-withdrawing group on the aromatic ring, have been found to provide especially good shelf stability. Good shelf stability has also been obtained using amines that are solids at room temperature. Good photosensitivity has been obtained using amines that contain one or more julolidinyl moieties.

Preferred amide electron donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide, tripiperidinophosphine oxide, and mixtures thereof.

Preferred alkylarylborate salts include
$Ar_3B^-(n-C_4H_9)N^+(C_2H_5)_4$
$Ar_3B^-(n-C_4H_9)N^+(CH_3)_4$
$Ar_3B^-(n-C_4H_9)N^+(n-C_4H_9)_4$
$Ar_3B^-(n-C_4H_9)Li^+$
$Ar_3B^-(n-C_4H_9)N^+(C_6H_{13})_4$
$Ar_3B^-—(C_4H_9)N^+(CH_3)_3(CH_2)_2CO_2(CH_2)_2CH_3$
$Ar_3B^-—(C_4H_9)N^+(CH_3)_3(CH_2)_2OCO(CH_2)_2CH_3$
$Ar_3B^-\text{-}(sec-C_4H_9)N^+(CH_3)_3(CH_2)_2CO_2(CH_2)_2CH_3$
$Ar_3B^-\text{-}(sec-C_4H_9)N^+(C_6H_{13})_4$
$Ar_3B^-—(C_4H_9)N^+(C_8H_{17})_4$
$Ar_3B^-—(C_4H_9)N^+(CH_3)_4$
$(p-CH_3O—C_6H_4)_3B^-(n-C_4H_9)N^+(n-C_4H_9)_4$
$Ar_3B^-—(C_4H_9)N^+(CH_3)_3(CH_2)_2OH$
$ArB^-(n-C_4H_9)_3N^+(CH_3)_4$
$ArB^-(C_2H_5)_3N^+(CH_3)_4$
$Ar_2B^-(n-C_4H_9)_2N^+(CH_3)_4$
$Ar_3B^-(C_4H_9)N^+(C_4H_9)_4$
$Ar_4B^-N^+(C_4H_9)_4$
$ArB^-(CH_3)_3N^+(CH_3)_4$
$(n-C_4H_9)_4B^-N^+(CH_3)_4$
$Ar_3B^-(C_4H_9)P^+(C_4H_9)_4$
(where Ar is phenyl, naphthyl, substituted (preferably, fluoro-substituted) phenyl, substituted naphthyl, and like groups having greater numbers of fused aromatic rings), as well as tetramethylammonium n-butyltriphenylborate and tetrabutylammonium n-hexyl-tris(3-fluorophenyl)borate, and mixtures thereof.

Suitable ether electron donor compounds include 4,4'-dimethoxybiphenyl, 1,2,4-trimethoxybenzene, 1,2,4,5-tetramethoxybenzene, and the like, and mixtures thereof. Suitable urea electron donor compounds include N,N'-dimethylurea, N,N-dimethylurea, N,N'-diphenylurea, tetramethylthiourea, tetraethylthiourea, tetra-n-butylthiourea, N,N-di-n-butylthiourea, N,N'-di-n-butylthiourea, N,N-diphenylthiourea, N,N'-diphenyl-N,N'-diethylthiourea, and the like, and mixtures thereof.

Preferred electron donor compounds for free radical-induced reactions include amines that contain one or more julolidinyl moieties, alkylarylborate salts, and salts of aromatic sulfinic acids. However, for such reactions, the electron donor compound can also be omitted, if desired (for example, to improve the shelf stability of the photoreactive composition or to modify resolution, contrast, and reciprocity). Preferred electron donor compounds for acid-induced reactions include 4-dimethylaminobenzoic acid, ethyl 4-dimethylaminobenzoate, 3-dimethylaminobenzoic acid, 4-dimethylaminobenzoin, 4-dimethylaminobenzaldehyde, 4-dimethylaminobenzonitrile, 4-dimethylaminophenethyl alcohol, and 1,2,4-trimethoxybenzene.

(3) Photoinitiators

Suitable photoinitiators (that is, electron acceptor compounds) for the reactive species of the photoreactive compositions are those that are capable of being photosensitized by accepting an electron from an electronic excited state of the multiphoton photosensitizer, resulting in the formation of at least one free radical and/or acid. Such photoinitiators include iodonium salts (for example, diaryliodonium salts), sulfonium salts (for example, triarylsulfonium salts optionally substituted with alkyl or alkoxy groups, and optionally having 2,2' oxy groups bridging adjacent aryl moieties), and the like, and mixtures thereof.

The photoinitiator is preferably soluble in the reactive species and is preferably shelf-stable (that is, does not spontaneously promote reaction of the reactive species when dissolved therein in the presence of the photosensitizer and the electron donor compound). Accordingly, selection of a particular photoinitiator can depend to some extent upon the particular reactive species, photosensitizer, and electron donor compound chosen, as described above. If the reactive species is capable of undergoing an acid-initiated chemical reaction, then the photoinitiator is an onium salt (for example, an iodonium or sulfonium salt).

Suitable iodonium salts include those described by Palazzotto et al. in U.S. Pat. No. 5,545,676 at column 2, lines 28 through 46. Suitable iodonium salts are also described in U.S. Pat. Nos. 3,729,313, 3,741,769, 3,808,006, 4,250,053 and 4,394,403. The iodonium salt can be a simple salt (for example, containing an anion such as $Cl^-$, $Br^-$, $I^-$ or $C_4H_5SO_3^-$) or a metal complex salt (for example, containing $SbF_6^-$, $PF_6^-$, $BF_4^-$, tetrakis(perfluorophenyl)borate, $SbF_5OH^-$ or $AsF_6^-$). Mixtures of iodonium salts can be used if desired.

Examples of useful aromatic iodonium complex salt photoinitiators include diphenyliodonium tetrafluoroborate; di(4-methylphenyl)iodonium tetrafluoroborate; phenyl-4-methylphenyliodonium tetrafluoroborate; di(4-heptylphenyl)iodonium tetrafluoroborate; di(3-nitrophenyl)iodonium hexafluorophosphate; di(4-chlorophenyl)iodonium hexafluorophosphate; di(naphthyl)iodonium tetrafluoroborate; di(4-trifluoromethylphenyl)iodonium tetrafluoroborate; diphenyliodonium hexafluorophosphate; di(4-methylphenyl)iodonium hexafluorophosphate; diphenyliodonium hexafluoroarsenate; di(4-phenoxyphenyl)iodonium tetrafluoroborate; phenyl-2-thienyliodonium hexafluorophosphate; 3,5-dimethylpyrazolyl-4-phenyliodonium hexafluorophosphate; diphenyliodonium hexafluoroantimonate; 2,2'-diphenyliodonium tetrafluoroborate; di(2,4-dichlorophenyl)iodonium hexafluorophosphate; di(4-bromophenyl)iodonium hexafluorophosphate; di(4-methoxyphenyl)iodonium hexafluorophosphate; di(3-carboxyphenyl)iodonium hexafluorophosphate; di(3-methoxycarbonylphenyl)iodonium hexafluorophosphate; di(3-methoxysulfonylphenyl)iodonium hexafluorophosphate; di(4-acetamidophenyl)iodonium hexafluorophosphate; di(2-benzothienyl)iodonium hexafluorophosphate; and diphenyliodonium hexafluoroantimonate; and the like; and mixtures thereof. Aromatic iodonium complex salts can be prepared by metathesis of corresponding aromatic iodonium simple salts (such as, for example, diphenyliodonium bisulfate) in accordance with the teachings of Beringer et al., J. Am. Chem. Soc. 81, 342 (1959).

Preferred iodonium salts include diphenyliodonium salts (such as diphenyliodonium chloride, diphenyliodonium hexafluorophosphate, and diphenyliodonium tetrafluoroborate), diaryliodonium hexafluoroantimonate (for example, SarCat™ SR 1012 available from Sartomer Company), and mixtures thereof.

Useful sulfonium salts include those described in U.S. Pat. No. 4,250,053 (Smith) at column 1, line 66, through column 4, line 2, which can be represented by the formulas:

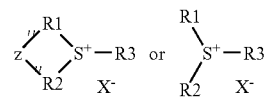

wherein $R_1$, $R_2$, and $R_3$ are each independently selected from aromatic groups having from about 4 to about 20 carbon atoms (for example, substituted or unsubstituted phenyl, naphthyl, thienyl, and furanyl, where substitution can be with such groups as alkoxy, alkylthio, arylthio, halogen, and so forth) and alkyl groups having from 1 to about 20 carbon atoms. As used here, the term "alkyl" includes substituted alkyl (for example, substituted with such groups as halogen, hydroxy, alkoxy, or aryl). At least one of $R_1$, $R_2$, and $R_3$ is aromatic, and, preferably, each is independently aromatic. Z is selected from the group consisting of a covalent bond, oxygen, sulfur, —S(=O)—, —C(=O)—, —(O=)S(=O)—, and —N(R)—, where R is aryl (of about 6 to about 20 carbons, such as phenyl), acyl (of about 2 to about 20 carbons, such as acetyl, benzoyl, and so forth), a carbon-to-carbon bond, or —($R_4$—)C(—$R_5$)—, where $R_4$ and $R_5$ are independently selected from the group consisting of hydrogen, alkyl groups having from 1 to about 4 carbon atoms, and alkenyl groups having from about 2 to about 4 carbon atoms. $X^-$ is an anion, as described below.

Suitable anions, $X^-$, for the sulfonium salts (and for any of the other types of photoinitiators) include a variety of anion types such as, for example, imide, methide, boron-centered, phosphorous-centered, antimony-centered, arsenic-centered, and aluminum-centered anions.

Illustrative, but not limiting, examples of suitable imide and methide anions include $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $((CF_3)_2NC_2F_4SO_2)_2N^-$, $(CF_3)_2NC_2F_4SO_2C^-(SO_2CF_3)_2$, $(3,5$-bis$(CF_3)C_6H_3)SO_2N^-SO_2CF_3$, $C_6H_5SO_2C^-(SO_2CF_3)_2$, $C_6H_5SO_2N^-SO_2CF_3$, and the like. Preferred anions of this type include those represented by the formula $(R_fSO_2)_3C^-$, wherein $R_f$ is a perfluoroalkyl radical having from 1 to about 4 carbon atoms.

Illustrative, but not limiting, examples of suitable boron-centered anions include $F_4B^-$, $(3,5$-bis$(CF_3)C_6H_3)_4B^-$, $(C_6F_5)_4B^-$, $(p$-$CF_3C_6H_4)_4B^-$, $(m$-$CF_3C_6H_4)_4B^-$, $(p$-$FC_6H_4)_4B^-$, $(C_6F_5)_3(CH_3)B^-$, $(C_6F_5)_3(n$-$C_4H_9)B^-$, $(p$-$CH_3C_6H_4)_3(C_6F_5)B^-$, $(C_6F_5)_3FB^-$, $(C_6H_5)_3(C_6F_5)B^-$, $(CH_3)_2(p$-$CF_3C_6H_4)_2B^-$, $(C_6F_5)_3(n$-$C_{18}H_{37}O)B^-$, and the like. Preferred boron-centered anions generally contain 3 or more halogen-substituted aromatic hydrocarbon radicals attached to boron, with fluorine being the most preferred halogen. Illustrative, but not limiting, examples of the preferred anions include $(3,5$-bis$(CF_3)C_6H_3)_4B^-$, $(C_6F_5)_4B^-$, $(C_6F_5)_3(n$-$C_4H_9)B^-$, $(C_6F_5)_3FB^-$, and $(C_6F_5)_3(CH_3)B^-$.

Suitable anions containing other metal or metalloid centers include, for example, $(3,5$-bis$(CF_3)C_6H_3)_4Al^-$, $(C_6F_5)_4Al^-$, $(C_6F_5)_2F_4P^-$, $(C_6F_5)F_5P^-$, $F_6P^-$, $(C_6F_5)F_5Sb^-$, $F_6Sb^-$, $(HO)F_5Sb^-$, and $F_6As^-$. The foregoing lists are not intended to be exhaustive, as other useful boron-centered nonnucleophilic salts, as well as other useful anions containing other metals or metalloids, will be readily apparent (from the foregoing general formulas) to those skilled in the art.

Preferably, the anion, X⁻, is selected from tetrafluoroborate, hexafluorophosphate, hexafluoroarsenate, hexafluoroantimonate, and hydroxypentafluoroantimonate (for example, for use with cationically-reactive species such as epoxy resins).

Examples of suitable sulfonium salt photoinitiators include:
triphenylsulfonium tetrafluoroborate
methyldiphenylsulfonium tetrafluoroborate
dimethylphenylsulfonium hexafluorophosphate
triphenylsulfonium hexafluorophosphate
triphenylsulfonium hexafluoroantimonate
diphenylnaphthylsulfonium hexafluoroarsenate
tritolysulfonium hexafluorophosphate
anisyldiphenylsulfonium hexafluoroantimonate
4-butoxyphenyldiphenylsulfonium tetrafluoroborate
4-chlorophenyldiphenylsulfonium hexafluorophosphate
tri(4-phenoxyphenyl)sulfonium hexafluorophosphate
di(4-ethoxyphenyl)methylsulfonium hexafluoroarsenate
4-acetonylphenyldiphenylsulfonium tetrafluoroborate
4-thiomethoxyphenyldiphenylsulfonium hexafluorophosphate
di(methoxysulfonylphenyl)methylsulfonium hexafluoroantimonate
di(nitrophenyl)phenylsulfonium hexafluoroantimonate
di(carbomethoxyphenyl)methylsulfonium hexafluorophosphate
4-acetamidophenyldiphenylsulfonium tetrafluoroborate
dimethylnaphthylsulfonium hexafluorophosphate
trifluoromethyldiphenylsulfonium tetrafluoroborate
p-(phenylthiophenyl)diphenylsulfonium hexafluoroantimonate
10-methylphenoxathiinium hexafluorophosphate
5-methylthianthrenium hexafluorophosphate
10-phenyl-9,9-dimethylthioxanthenium hexafluorophosphate
10-phenyl-9-oxothioxanthenium tetrafluoroborate
5-methyl-10-oxothianthrenium tetrafluoroborate
5-methyl-10,10-dioxothianthrenium hexafluorophosphate Preferred sulfonium salts include triaryl-substituted salts such as triarylsulfonium hexafluoroantimonate (for example, SarCat™ SR1010 available from Sartomer Company), triarylsulfonium hexafluorophosphate (for example, SarCat™ SR 1011 available from Sartomer Company), and triarylsulfonium hexafluorophosphate (for example, SarCat™ KI85 available from Sartomer Company).

Preferred photoinitiators include iodonium salts (more preferably, aryliodonium salts), sulfonium salts, and mixtures thereof. More preferred are aryliodonium salts and mixtures thereof.

Preparation of Photoreactive Composition

The reactive species, multiphoton photosensitizers, electron donor compounds, and photoinitiators can be prepared by the methods described above or by other methods known in the art, and many are commercially available. These four components can be combined under "safe light" conditions using any order and manner of combination (optionally, with stirring or agitation), although it is sometimes preferable (from a shelf life and thermal stability standpoint) to add the photoinitiator last (and after any heating step that is optionally used to facilitate dissolution of other components). Solvent can be used, if desired, provided that the solvent is chosen so as to not react appreciably with the components of the composition. Suitable solvents include, for example, acetone, dichloromethane, and acetonitrile. The reactive species itself can also sometimes serve as a solvent for the other components.

The three components of the photoinitiator system are present in photochemically effective amounts (as defined above). Generally, the composition can contain at least about 5% (preferably, at least about 10%; more preferably, at least about 20%) up to about 99.79% (preferably, up to about 95%; more preferably, up to about 80%) by weight of one or more reactive species; at least about 0.01% (preferably, at least about 0.1%; more preferably, at least about 0.2%) up to about 10% (preferably, up to about 5%; more preferably, up to about 2%) by weight of one or more photosensitizers; optionally, up to about 10% (preferably, up to about 5%) by weight of one or more electron donor compounds (preferably, at least about 0.1%; more preferably, from about 0.1% to about 5%); and from about 0.1% to about 10% by weight of one or more electron acceptor compounds (preferably, from about 0.1% to about 5%) based upon the total weight of solids (that is, the total weight of components other than solvent).

A wide variety of adjuvants can be included in the photoreactive compositions, depending upon the desired end use. Suitable adjuvants include solvents, diluents, resins, binders, plasticizers, pigments, dyes, inorganic or organic reinforcing or extending fillers (at preferred amounts of about 10% to 90% by weight based on the total weight of the composition), thixotropic agents, indicators, inhibitors, stabilizers, ultraviolet absorbers, and the like. The amounts and types of such adjuvants and their manner of addition to the compositions will be familiar to those skilled in the art.

It is within the scope of this invention to include nonreactive polymeric binders in the compositions in order, for example, to control viscosity and to provide film-forming properties. Such polymeric binders can generally be chosen to be compatible with the reactive species. For example, polymeric binders that are soluble in the same solvent that is used for the reactive species, and that are free of functional groups that can adversely affect the course of reaction of the reactive species, can be utilized. Binders can be of a molecular weight suitable to achieve desired film-forming properties and solution rheology (for example, molecular weights between about 5,000 and 1,000,000 Daltons; preferably between about 10,000 and 500,000 Daltons; more preferably, between about 15,000 and 250,000 Daltons). Suitable polymeric binders include, for example, polystyrene, poly(methyl methacrylate), poly(styrene)-co-(acrylonitrile), cellulose acetate butyrate, and the like.

Prior to exposure, the resulting photoreactive compositions can be coated on a substrate, if desired, by any of a variety of coating methods known to those skilled in the art (including, for example, knife coating and spin coating). The substrate can be chosen from a wide variety of films, sheets, and other surfaces (including silicon wafers and glass plates), depending upon the particular application and the method of exposure to be utilized. Preferred substrates are generally sufficiently flat to enable the preparation of a layer of photoreactive composition having a uniform thickness. For applications where coating is less desirable, the photoreactive compositions can alternatively be exposed in bulk form.

Exposure System and its Use

In carrying out the process of the invention, a photoreactive composition can be exposed to light under conditions such that multiphoton absorption occurs, thereby causing a region of differential solubility characteristics (for example, lesser or greater solubility in a particular solvent) as compared to the photoreactive composition prior to exposure. Such exposure can be accomplished by any known means capable of achieving sufficient intensity of the light.

One exemplary type of system that can be used is shown in FIG. 1. Referring to FIG. 1, fabrication system 10 includes light source 12, optical system 14 comprising a final optical element 15 (optionally including galvo-mirrors and a telescope to control beam divergence), and moveable stage 16. Stage 16 is moveable in one, two, or, more typically, three dimensions. Substrate 18 mounted on stage 16 has a layer 20 of photoreactive composition 24 thereon. Light beam 26 originating from light source 12 passes through optical system 14 and leaves through final optical element 15 which focuses it to a point P within layer 20, thereby controlling the three-dimensional spatial distribution of light intensity within the composition and causing at least a portion of photoreactive composition 24 in the vicinity of point P to become more, or less, soluble in at least one solvent than it was immediately prior to exposure to light beam 26.

By moving stage 16, or by directing light beam 26 (for example, moving a laser beam using galvo-mirrors and a telescope) in combination with moving one or more elements of optical system 14, the focal point P can be scanned or translated in a three-dimensional pattern that corresponds to a desired shape. The resulting reacted or partially reacted portion of photoreactive composition 24 then creates a three-dimensional structure of the desired shape. For example, in a single pass the surface profile (corresponding to a thickness of about one volume pixel or voxel) of one or more light extraction structures can be exposed or imaged, which upon development can form the surface of the structure(s).

The imagewise exposing of the surface profile can be carried out by scanning at least the perimeter of a planar slice of a desired three-dimensional structure and then scanning a plurality of preferably parallel, planar slices to complete the structure. Slice thickness can be controlled to achieve a sufficiently low level of surface roughness to provide optical quality light extraction structures. For example, smaller slice thicknesses can be desirable in regions of greater structure taper to aid in achieving high structure fidelity, but larger slice thicknesses can be utilized in regions of less structure taper to aid in maintaining useful fabrication times. In this way, a surface roughness less than the slice thickness (preferably, less than about one-half of the slice thickness; more preferably, less than about one-quarter of the slice thickness) can be achieved without sacrificing fabrication speed (throughput or number of structures fabricated per unit time).

When the photoreactive composition is coated on a substrate that exhibits a degree of non-planarity that is of the same or greater size magnitude as voxel height, it can be desirable to compensate for the non-planarity to avoid optically- or physically-defective structures. This can be accomplished by locating (for example, using a confocal interface locator system, interferometry, or fluorescence interface locator system) the position of the interface between the substrate and the portion of the photoreactive composition that is to be exposed, and then adjusting the location of the optical system 14 appropriately to focus light beam 26 at the interface. (Such a procedure is described in detail in a co-pending and co-filed patent application bearing Appl. No. 60/752,529, the description of which is incorporated herein by reference.) Preferably, this procedure can be followed for at least one structure out of every twenty structures in an array (more preferably, at least one out of every ten; most preferably, for each structure in the array).

Light source 12 can be any light source that produces sufficient light intensity to effect multiphoton absorption. Suitable sources include, for example, femtosecond near-infrared titanium sapphire oscillators (for example, those available from Coherent, Santa Clara, Calif., under the trade designation "MIRA OPTIMA 900-F") pumped by an argon ion laser (for example, those available from Coherent under the trade designation "INNOVA"). This laser, operating at 76 MHz, has a pulse width of less than 200 femtoseconds, is tunable between 700 and 980 nm, and has average power up to 1.4 Watts. Another useful laser is available from Spectra-Physics, Mountain View, Calif., under the trade designation "MAI TAI", tunable to wavelengths in a range of from 750 to 850 nanometers, and having a repetition frequency of 80 megahertz, and a pulse width of about 100 femtoseconds ($1 \times 10^{-13}$ sec), with an average power level up to 1 Watt.

However, any light source (for example, a laser) that provides sufficient intensity to effect multiphoton absorption at a wavelength appropriate for the multiphoton absorber used in the photoreactive composition can be utilized. Such wavelengths can generally be in the range of about 300 to about 1500 nm; preferably, from about 400 to about 1100 nm; more preferably, from about 600 to about 900 nm; more preferably, from about 750 to about 850 nm, inclusive. Typically, the light fluence (for example, peak intensity of a pulsed laser) is greater than about $10^6$ W/cm$^2$. The upper limit on the light fluence is generally dictated by the ablation threshold of the photoreactive composition. For example, Q-switched Nd:YAG lasers (for example, those available from Spectra-Physics under the trade designation "QUANTA-RAY PRO"), visible wavelength dye lasers (for example, those available from Spectra-Physics under the trade designation "SIRAH" pumped by a Q-switched Nd:YAG laser from Spectra-Physics having the trade designation "Quanta-Ray PRO"), and Q-switched diode pumped lasers (for example, those available from Spectra-Physics under the trade designation "FCBAR") can also be utilized.

Preferred light sources are near infrared pulsed lasers having a pulse length less than about $10^{-8}$ second (more preferably, less than about $10^{-9}$ second; most preferably, less than about $10^{-11}$ second). Other pulse lengths can be used as long as the peak intensity and ablation threshold criteria above are met. Pulsed radiation can, for example, have a pulse frequency of from about one kilohertz up to about 50 megahertz, or even more. Continuous wave lasers can also be used.

Optical system 14 can include, for example, refractive optical elements (for example, lenses or microlens arrays), reflective optical elements (for example, retroreflectors or focusing mirrors), diffractive optical elements (for example, gratings, phase masks, and holograms), polarizing optical elements (for example, linear polarizers and waveplates), dispersive optical elements (for example, prisms and gratings), diffusers, Pockels cells, waveguides, and the like. Such optical elements are useful for focusing, beam delivery, beam/mode shaping, pulse shaping, and pulse timing. Generally, combinations of optical elements can be utilized, and other appropriate combinations will be recognized by those skilled in the art. Final optical element 15 can include, for example, one or more refractive, reflective, and/or diffractive optical elements. In one embodiment, an objective such as, for example, those used in microscopy can be conveniently obtained from commercial sources such as, for example, Carl Zeiss, North America, Thornwood, N.Y., and used as final optical element 15. For example, fabrication system 10 can include a scanning confocal microscope (for example, those available from Bio-Rad Laboratories, Hercules, Calif., under the trade designation "MRC600") equipped with a 0.75 numerical aperture (NA) objective (such as, for example, those available from Carl Zeiss, North America under the trade designation "20X FLUAR").

It can often be desirable to use optics with relatively large numerical aperture to provide highly-focused light. However, any combination of optical elements that provides a desired intensity profile (and spatial placement thereof) can be utilized.

Exposure times generally depend upon the type of exposure system used to cause reaction of the reactive species in the photoreactive composition (and its accompanying variables such as numerical aperture, geometry of light intensity spatial distribution, the peak light intensity during the laser pulse (higher intensity and shorter pulse duration roughly correspond to peak light intensity)), as well as upon the nature of the photoreactive composition. Generally, higher peak light intensity in the regions of focus allows shorter exposure times, everything else being equal. Linear imaging or "writing" speeds generally can be about 5 to 100,000 microns/second using a laser pulse duration of about $10^{-8}$ to $10^{-15}$ second (for example, about $10^{-11}$ to $10^{-14}$ second) and about $10^2$ to $10^9$ pulses per second (for example, about $10^3$ to $10^8$ pulses per second).

In order to facilitate solvent development of the exposed photoreactive composition and obtain a fabricated light extraction structure, a threshold dose of light (that is, threshold dose) can be utilized. This threshold dose is typically process specific, and can depend on variables such as, for example, the wavelength, pulse frequency, intensity of the light, the specific photoreactive composition, the specific structure being fabricated, or the process used for solvent development. Thus, each set of process parameters can typically be characterized by a threshold dose. Higher doses of light than the threshold can be used, and can be beneficial, but higher doses (once above the threshold dose) can typically be used with a slower writing speed and/or higher light intensity.

Increasing the dose of light tends to increase the volume and aspect ratio of voxels generated by the process. Thus, in order to obtain voxels of low aspect ratio, it is generally preferable to use a light dose that is less than about 10 times the threshold dose, preferably less than about 4 times the threshold dose, and more preferably less than about 3 times the threshold dose. In order to obtain voxels of low aspect ratio, the radial intensity profile of light beam 26 is preferably Gaussian.

Through multiphoton absorption, light beam 26 induces a reaction in the photoreactive composition that produces a volume region of material having solubility characteristics different from those of the unexposed photoreactive composition. The resulting pattern of differential solubility can then be realized by a conventional development process, for example, by removing either exposed or unexposed regions.

The exposed photoreactive composition can be developed, for example, by placing the exposed photoreactive composition into solvent to dissolve regions of higher solvent solubility, by rinsing with solvent, by evaporation, by oxygen plasma etching, by other known methods, and by combinations thereof. Solvents that can be used for developing the exposed photoreactive composition include aqueous solvents such as, for example, water (for example, having a pH in a range of from 1 to 12) and miscible blends of water with organic solvents (for example, methanol, ethanol, propanol, acetone, acetonitrile, dimethylformamide, N-methylpyrrolidone, and the like, and mixtures thereof); and organic solvents. Exemplary useful organic solvents include alcohols (for example, methanol, ethanol, and propanol), ketones (for example, acetone, cyclopentanone, and methyl ethyl ketone), aromatics (for example, toluene), halocarbons (for example, methylene chloride and chloroform), nitriles (for example, acetonitrile), esters (for example, ethyl acetate and propylene glycol methyl ether acetate), ethers (for example, diethyl ether and tetrahydrofuran), amides (for example, N-methylpyrrolidone), and the like, and mixtures thereof.

An optional bake after exposure to light under multiphoton absorption conditions, but prior to solvent development, can be useful for some photoreactive compositions such as, for example, epoxy-type reactive species. Typical bake conditions include temperatures in a range of from about 40° C. to about 200° C., for times in a range of from about 0.5 minutes to about 20 minutes.

Optionally, after exposure of only the surface profile of a light extraction structure array, preferably followed by solvent development, a nonimagewise exposure using actinic radiation can be carried out to effect reaction of the remaining unreacted photoreactive composition. Such a nonimagewise exposure can preferably be carried out by using a one-photon process.

Complex three-dimensional light extraction structures and light extraction structure arrays can be prepared in this manner.

Light Extraction Structure Arrays

The process of the invention can be used to flexibly and controllably provide arrays comprising light extraction structures of a variety of sizes and geometric configurations or surface profiles (including, for example, both protruding and recessed structures). The process can be particularly well-suited, however, for providing light extraction structure arrays exhibiting at least some variation in at least one shape factor as a function of position within the array and/or exhibiting a non-uniform distribution of light extraction structures. For example, arrays exhibiting a controlled spatial variation of light extraction structure height and/or spacing across the array can be useful for modifying the uniformity and efficiency of light extraction.

For example, the process can be used to fabricate arrays comprising light extraction structures having heights of protruding structures (or depths of recessed structures) in the range of about 5 microns to about 300 microns (preferably, about 50 to about 200; more preferably, about 75 to about 150) and/or maximum lengths and/or maximum widths in the range of about 5 microns to about 500 microns (preferably, about 50 to about 300; more preferably, about 100 to about 300). A wide range of fill factors (up to 100 percent) can be achieved. For many applications, fill factors of about 1 percent to 100 percent (preferably, about 5 percent to about 75 percent) can be useful.

Light extraction structures having various geometric configurations (for example, cones, aspheres, truncated aspheres, and truncated cones, where "truncated" configurations have both a base and a second truncation that can form a planar top surface) can be fabricated with array fill factors up to 100 percent. The configurations can be complex (for example, combining segments of multiple shapes in a single structure, such as a stacked combination of an asphere and a pyramid or a cone). Preferred geometric configurations include those that are both truncated and symmetrical (for example, truncated cones, truncated aspheres, and combinations thereof).

Geometric configurations can comprise such structural elements as a base, one or more faces (for example, that form a side wall), and a top (which can be, for example, a planar surface (for example, formed by truncation) or even a point). Such elements can be of essentially any shape (for example, bases, faces, and tops can be circular, elliptical, or polygonal (regular or irregular), and the resulting side walls can be characterized by a vertical cross section (taken perpendicular to the base) that is parabolic, hyperbolic, or linear in nature, or a combination thereof). Preferably, the side wall is not perpendicular to the base of the structure (for example, vertical tangent angles at the base of about 10 degrees to about 80 degrees (preferably, about 20 to about 70; more preferably, about 30 to about 60) can be useful). The light extraction structure can have a principal axis connecting the center of its top with the center of its base. Tilt angles (the angle between the principal axis and the base) of up to about 80 degrees (preferably, up to about 25 degrees) can be achieved, depending upon the desired brightness and field of view.

The process of the invention can be used to fabricate patterned or random, heterogeneous light extraction structure array masterforms with multiple structure designs in a single writing process. Average surface roughnesses of $\lambda/2$ (preferably, $\lambda/4$; more preferably, $\lambda/10$; most preferably, $\lambda/20$) can be achieved (where $\lambda$ (lambda) is the wavelength of light for which the structure is designed; hereinafter the "operating wavelength").

The fill factor of the arrays can be varied to control brightness and uniformity. The packing arrangement or distribution of the structures can be regular (for example, square or hexagonal) or irregular. The shape factors of the structures comprising the array can also vary throughout the array. For example, the heights can be varied according to the distance of a particular structure from a light source (to achieve uniform light extraction). To maintain continuously uniform light output (and minimize or eliminate bright spots), arrays exhibiting an irregular variation in shape factor and/or areal density can be prepared. Preferably, both areal density and at least one shape factor vary across the array (more preferably, both vary and at least one varies irregularly). As used herein, "regular variation" means changing by a defined (for example, mathematically prescribed) amount (for example, linearly, exponentially, or according to a power series) per unit distance across the array.

The process of the invention can also be used to fabricate arrays comprising at least two light extraction structures that have non-parallel principal axes (hereinafter, termed "tilted structure" arrays). Such arrays can exhibit an independent variation in tilt angle from structure to structure across the array.

Thus, a preferred light extraction structure array comprises a plurality of light extraction structures having a non-uniform distribution, each light extraction structure having a principal axis and at least one shape factor, and the plurality exhibiting a variation in areal density, in at least one shape factor, and in principal axis across the plurality of light extraction structures. (More preferably, the geometric configuration of at least one light extraction structure is selected from truncated cones, truncated aspheres, and combinations thereof, and/or the variation exhibited by the plurality is irregular across the plurality for at least one of areal density, shape factor, and principal axis.) Such arrays can be useful, for example, for directing extracted light in multiple directions, in accordance with the variation in principal axis across the plurality of light extraction structures.

Another preferred light extraction structure array comprises a plurality of light extraction structures having a non-uniform distribution, each of the light extraction structures having a geometric configuration, and the geometric configuration of at least one light extraction structure being a truncated asphere. (More preferably, the geometric configuration of each light extraction structure in the array is selected from aspheres, truncated aspheres, and combinations thereof.) Such arrays can be useful, for example, for achieving uniform extracted light output without the appearance of discrete bright spots or lines (which can result from approaches that involve only a reduction in light extraction structure density in regions of the array that are relatively close to a light source). Uniformity of output can be achieved without such bright spots, for example, by maintaining a relatively high density of light extraction structures (for example, having a spacing of less than about 200 micrometers; preferably, less than about 150 micrometers), as well as reducing light extraction structure efficiency through truncation, in the regions of the array that are relatively close to the light source.

Preparation of Replication Tool from Master

A replication tool, such as a mold insert, can be prepared by using a light extraction structure array prepared as described above as a master. That is, another material can be placed against the master to prepare a mold insert having the negative image of the array. The master can then be removed, leaving a mold insert that can subsequently be used to prepare additional arrays. The mold insert will have cavities in the shape of the negative image of the array. A metal replication tool can be made from a master by electroplating or electroforming a metal, such as nickel, against the master and subsequently removing the master. A silicone replication tool can be made by curing a silicone resin against the master and subsequently removing the master.

Light Guides and Optical Devices

Light guides comprising the light extraction structure arrays of the invention can be fabricated from a wide variety of optically suitable materials including polycarbonates; polyacrylates such as polymethyl methacrylate; polystyrene; and glass; with high refractive index materials such as polyacrylates and polycarbonates being preferred. The light guides preferably are made by molding, embossing, curing, or otherwise forming an injection moldable resin against the above-described replication tool. Most preferably, a cast and cure technique is utilized. Methods for molding, embossing, or curing the light guide will be familiar to those skilled in the art. Coatings (for example, reflective coatings of thin metal) can be applied to at least a portion of one or more surfaces of the light guides (for example, to the interior or recessed surface of light extraction structures) by known methods, if desired. Individual light guide designs can, if desired, be evaluated without the need for actual fabrication by using suitable ray-tracing modeling software such as "ASAP" from Breault Research Organization, Inc., "Code V" and "Light Tools" from Optical Research Associates, Inc., "Rayica" from the Optica Software Division of i-Cyt Mission Technology, Inc., "Trace Pro" from Lambda Research, Inc., and "ZEMAX" from Zemax Development Corporation.

The light guides of the present invention can be especially useful in backlit displays (for example, comprising a light source, a light gating device (for example, a liquid crystal display (LCD)), and a light guide) and keypads (for example, comprising a light source, an array of pressure-sensitive switches at least a portion of which transmits light, and a light guide). The light guides are useful as point to area or line to area back light guides for subminiature or miniature display or keypad devices illuminated with light emitting diodes (LEDs) powered by small batteries. Suitable display devices include color or monochrome LCD devices for cell phones, pagers, personal digital assistants, clocks, watches, calculators, laptop computers, vehicular displays, and the like. Other display devices include flat panel displays such as laptop computer displays or desktop flat panel displays. Suitable backlit keypad devices include keypads for cell phones, pagers, personal digital assistants, calculators, vehicular displays, and the like In addition to LEDs, other suitable light sources for displays and keypads include fluorescent lamps (for example, cold cathode fluorescent lamps), incandescent lamps, electroluminescent lights, and the like. The light sources can be mechanically held in any suitable manner in slots, cavities, or openings machined, molded, or otherwise formed in light transition areas of the light guides. Preferably, however, the light sources are embedded, potted, or bonded in the light transition areas in order to eliminate any air gaps or air interface surfaces between the light sources and surrounding light transition areas, thereby reducing light loss and increasing the light output emitted by the light guide. Such mounting of the light sources can be accomplished, for example, by bonding the light sources in the slots, cavities, or openings in the light transition areas using a sufficient quantity of a suitable embedding, potting, or bonding material. The slots, cavities, or openings can be on the top, bottom, sides, or back of the light transition areas. Bonding can also be accomplished by a variety of methods that do not incorporate extra material, for example, thermal bonding, heat staking, ultrasonic welding, plastic welding, and the like. Other methods of bonding include insert molding and casting around the light source(s).

EXAMPLES

Objects and advantages of this invention are further illustrated by the following examples, but the particular materials and amounts thereof recited in these examples, as well as other conditions and details, should not be construed to unduly limit this invention. Unless otherwise noted, all procedures were carried out under a dry nitrogen atmosphere with dry and deoxygenated solvents and reagents. Unless otherwise noted, all solvents and reagents were or can be obtained from Aldrich Chemical Co., Milwaukee, Wis.

As used herein,

"SR1012" refers to diaryliodonium hexafluoroantimonate, obtained from Sartomer Co., Inc., Exton, Pa.; and "Strippable SU-8" refers to SU-8XP KMPR epoxy negative photoresist obtained from MicroChem Corp., Newton, Mass.;

"SU-8" refers to SU-8 2150 epoxy negative photoresist obtained from MicroChem. Corp., Newton, Mass.

Example 1

Fabrication of a Light Extraction Structure Array

A circular silicon wafer (10.2 cm (4 inches) in diameter; obtained from Wafer World, Inc., West Palm Beach, Fla.) was cleaned by soaking it for approximately ten minutes in a 3:1 volume/volume (v/v) mixture of concentrated sulfuric acid and 30 weight percent aqueous hydrogen peroxide. The wafer was then rinsed with deionized water and then with isopropanol, after which it was dried under a stream of air. The wafer was then spin-coated with XP OmniCoat primer (Micro-Chem. Corp., Newton, Mass.) at 500 revolutions per minute (RPM) for 5 seconds followed by 2700 RPM for 25 seconds. The wafer was then placed on a hot plate at 200° C. for 1 minute to dry.

A concentrated solution of photosensitizer dye N,N,N-tris (7-(2-benzothiazolyl)-9,9-diethyl-2-fluorenyl)amine (described along with its synthesis in Example 20 of U.S. Pat. No. 6,300,502 (Kannan et al.)) and SR1012 in cyclopentanone (available from Lancaster Synthesis, Windham, N.H.) was prepared. The solution was syringed through a 0.2 micrometer (µm) polytetrafluoroethylene (PTFE) filter cartridge and was added to Strippable SU-8 to make a solution of 0.5 percent (%) photosensitizer dye and 1.0% SR-1012 (based upon total weight of solids). The resulting solution was then filtered through a 1.0 µm glass fiber filter and then a 0.7 µm glass fiber filter.

The filtered solution was poured into a 5 cm×5 cm (inside dimensions) area masked with a green gasket tape on the primed silicon wafer. The wafer was allowed to dry at room temperature over the weekend and was then placed in a forced air oven for 30 minutes at 65° C., followed by 90 minutes at 95° C., followed by 30 minutes at 65° C. to afford a coated silicon wafer with a substantially solvent-free (hereinafter, "dry") coating thickness of approximately 300 µm.

The backside of the wafer was cleaned with isopropyl alcohol to remove any debris. The wafer was then mounted on a porous carbon vacuum chuck (flatness greater than 1 µm). A two-photon fabrication system was then activated to produce an optical signal that was stationary in the vertical position (the fabrication system was not activating the z-control to move the signal in the vertical direction). The signal was used as a detection mechanism to produce a reflection off of the wafer surface in conjunction with a confocal microscope system such that the only condition that would produce a confocal response would occur when the optical signal was focused on the surface of the wafer. The system was aligned to the interface between the coating of photosensitive material and the wafer in the vertical direction.

Two-photon polymerization of the dry coating was carried out in the following manner, using a diode-pumped Ti:sapphire laser (Spectra-Physics, Mountain View, Calif.) operating at a wavelength of 800 nm, nominal pulse width of 80 fs, pulse repetition rate of 80 MHz, and average power of approximately 1 W. The coated wafer was placed on a computer-controllable three-axis stage (obtained from Aerotech, Inc., Pittsburgh, Pa.). The laser beam was attenuated by neutral density filters and was focused into the dry coating using a galvoscanner with telescope for x, y, and z-axis control (available from Nutfield Technology, Inc., Windham, N.H.) and a lens (Nikon CFI Plan Achromat 50X oil objective N.A. 0.90, working distance 0.400 mm, 4.0 mm focal length), which was applied directly on the surface of the dry coating. The average power was measured at the output of the objective lens using a wavelength-calibrated photodiode (obtained from Ophir Optronics, Ltd., Wilmington, Mass.) and was determined to be approximately 9 mW.

Figure 2:
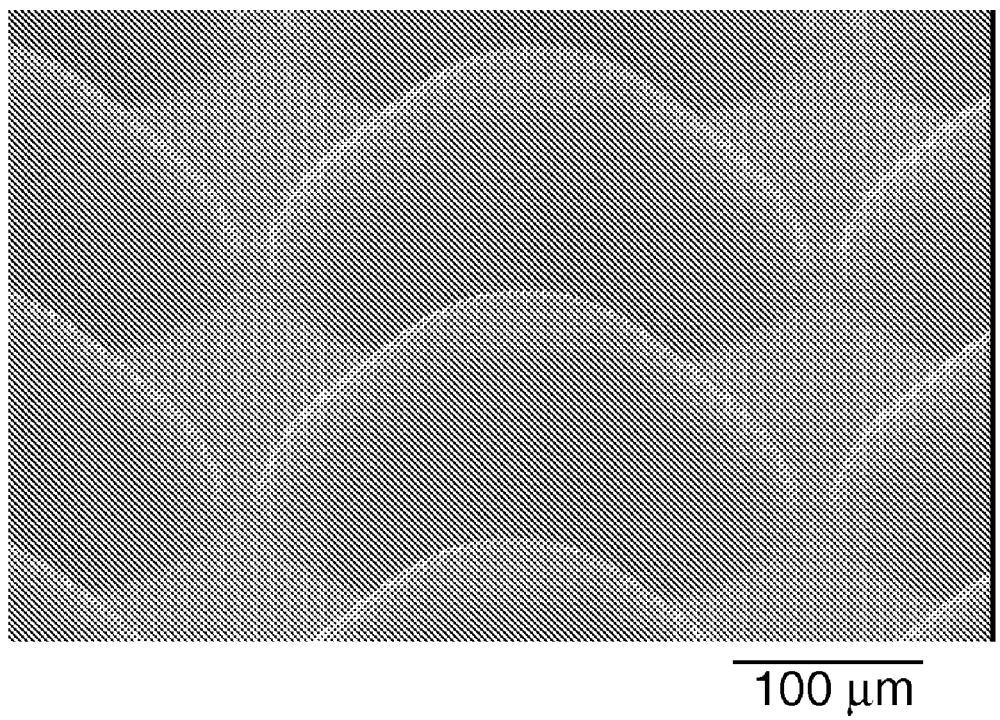
FIG. 2 is a scanning electron micrograph (a side view) of an embodiment of the light extraction structure array of the invention, which embodiment was produced by the process of the invention and is described in Example 1 below.
Figure 3A:
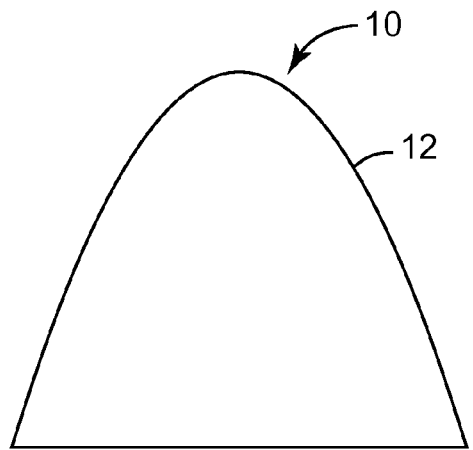
FIGS. 3a-3d show side sectional views of exemplary light extraction structures that can be produced by carrying out embodiments of the process of the invention, the light extraction structures each having at least one shape factor including a geometric configuration.
Figure 3B:
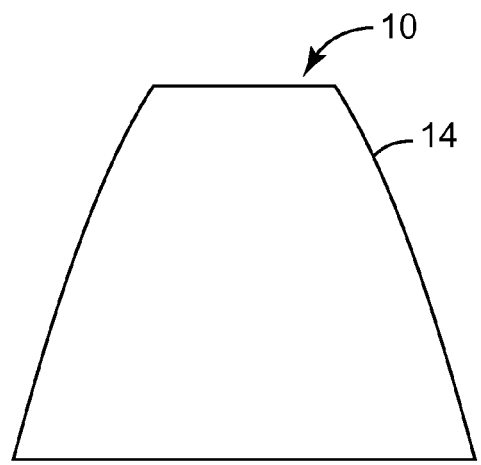
Figure 3C:
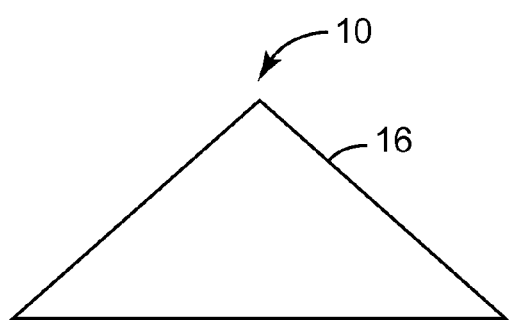
Figure 3D:
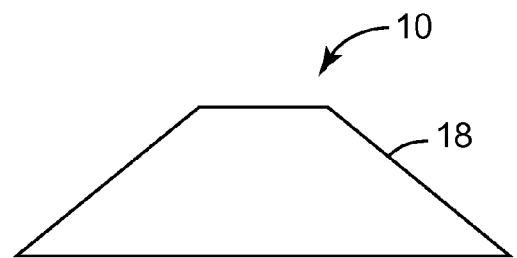
Figure 4A:
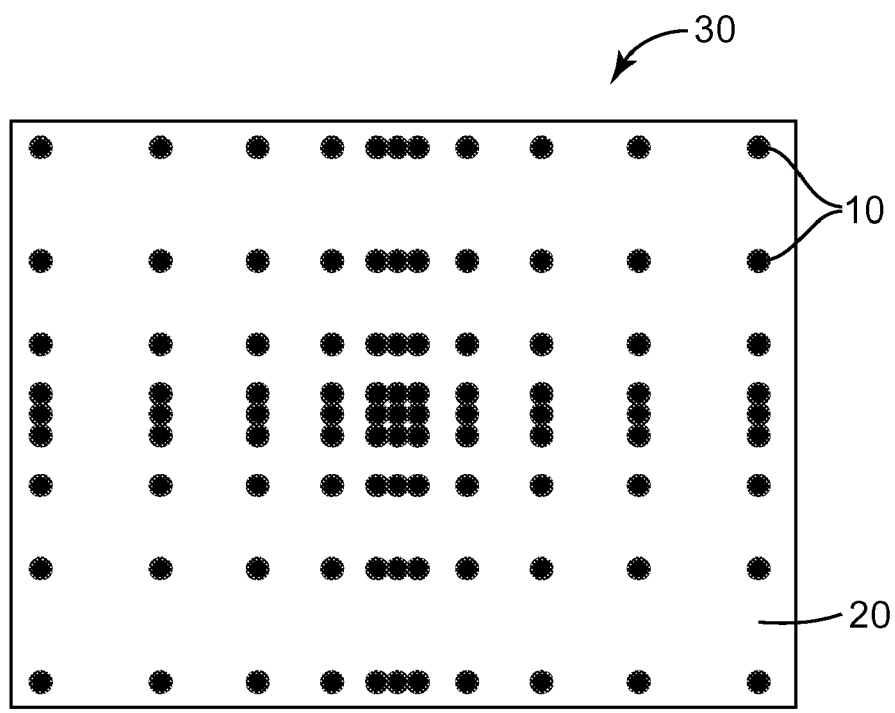
FIGS. 4a and 4b show top plan views of exemplary light guides that can be produced by carrying out embodiments of the process of the invention.
Figure 4B:
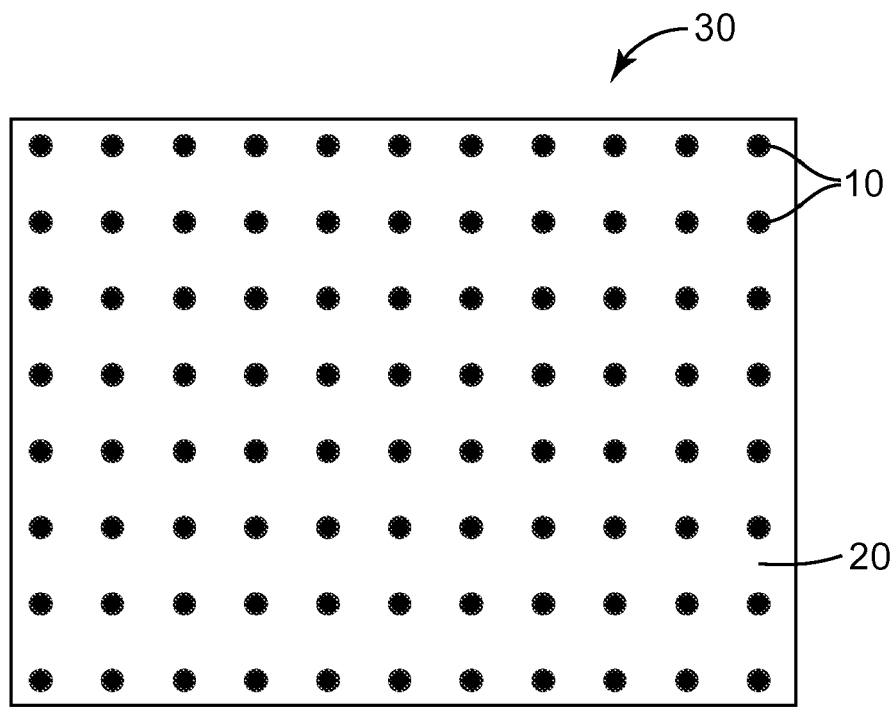

A software file that was produced using a CAD program (AUTODESK INVENTOR available from Autodesk, San Raphael, Calif.) and that described a truncated cone structure was then loaded into the laser scanning software of the two-photon fabrication system. The scanning software sliced the prescribed structure into planes with a vertical separation sufficiently small to result in a final polymerized array of structures with low surface roughness. The slice thickness was chosen in the software to be 500 nm, and each planar slice was cross-hatched with hatch spacing of 2 microns to provide an approximately fully cured structure. The system was then activated to scan the laser beam to polymerize the coating of photosensitive material to define the truncated cone structures. The system was operated in an automated fashion to place light extraction structures (in the form of truncated cones) at prescribed positions (corresponding to the positions of pressure-sensitive switches (buttons) associated with a cellphone keypad), using a software model that optimized the structure locations for optimum light extraction uniformity and efficiency. The distribution of the resulting array, as well as that of each cluster of structures corresponding to the button positions, was non-uniform. Following imaging on the two-photon laser scanner, the photosensitive material was cured at 95 degrees C. The resulting cured array was subsequently developed using MicroChem SU-8 developer for approximately 90 minutes. FIG. 2 shows a scanning electron micrograph of a side view of a portion of the resulting developed array.

Example 2

Fabrication of a Light Extraction Structure Array

A circular silicon wafer (10.2 cm (4 inches) in diameter; obtained from Wafer World, Inc., West Palm Beach, Fla.) was spin-coated with XP OmniCoat primer (MicroChem. Corp., Newton, Mass.) at 500 revolutions per minute (RPM) for 5 seconds followed by 2700 RPM for 25 seconds. The wafer was then placed on a hot plate at 200° C. for 1 minute to dry.

A concentrated solution of photosensitizer dye N,N,N-tris (7-(2-benzothiazolyl)-9,9-diethyl-2-fluorenyl)amine (described along with its synthesis in Example 20 of U.S. Pat. No. 6,300,502 (Kannan et al.)) and SR1012 in cyclopentanone (available from Lancaster Synthesis, Windham, N.H.) was prepared. The solution was syringed through a 0.2 micrometer (μm) polytetrafluoroethylene (PTFE) filter cartridge and was added to SU-8 to make a solution of 0.5 percent (%) photosensitizer dye and 1.0% SR-1012 (based upon total weight of solids). The resulting solution was then filtered through a 1.0 μm glass fiber filter and then a 0.7 μm glass fiber filter. The filtered solution was coated onto the silicon wafer by spin coating, followed by removal of solvent at 80° C. for 10 minutes, to yield a dry coating thickness of about 30 μm.

The backside of the wafer was cleaned with isopropyl alcohol to remove any debris. The wafer was then mounted on a porous carbon vacuum chuck (flatness less than 1 μm). A two-photon fabrication system was then activated to produce an optical signal that was stationary in the vertical position (the fabrication system was not activating the z-control to move the signal in the vertical direction). The signal was used as a detection mechanism to produce a reflection off of the wafer surface in conjunction with a confocal microscope system such that the only condition that would produce a confocal response would occur when the optical signal was focused on the surface of the wafer. The system was aligned to the interface between the coating of photosensitive material and the wafer in the vertical direction.

Two-photon polymerization of the dry coating was carried out in the following manner, using a diode-pumped Ti:sapphire laser (Spectra-Physics, Mountain View, Calif.) operating at a wavelength of 800 nm, nominal pulse width of 80 fs, pulse repetition rate of 80 MHz, and average power of approximately 1 W. The coated wafer was placed on a computer-controllable three-axis stage (obtained from Aerotech, Inc., Pittsburgh, Pa.). The laser beam was attenuated by neutral density filters and was focused into the dry coating using a galvoscanner with telescope for x, y, and z-axis control (available from Nutfield Technology, Inc., Windham, N.H.) and a lens (Nikon CFI Plan Achromat 50X oil objective N.A. 0.90, working distance 0.400 mm, 4.0 mm focal length), which was applied directly on the surface of the dry coating. The average power was measured at the output of the objective lens using a wavelength-calibrated photodiode (obtained from Ophir Optronics, Ltd., Wilmington, Mass.) and was determined to be approximately 16 mW.

A software file that was produced using a CAD program (AUTODESK INVENTOR available from Autodesk, San Raphael, Calif.) and that described a truncated asphere structure for regions relatively close to a light-emitting diode (LED) light source and a non-truncated asphere structure for the region farthest away from the LED light source) was then loaded into the laser scanning software of the two-photon fabrication system. The scanning software sliced the prescribed structure into planes with a vertical separation sufficiently small to result in a final polymerized array of structures with low surface roughness. The slice thickness was chosen in the software to be 500 nm, and each planar slice was cross-hatched with hatch spacing of 2 microns to provide an approximately fully cured structure. The system was then activated to scan the laser beam to polymerize the coating of photosensitive material to define the structures. The system was operated in an automated fashion to place light extraction structures (in the form of truncated and non-truncated aspheres) at prescribed positions (described below) using a software model that optimized the structure locations for optimum light extraction uniformity and efficiency. The distribution of the resulting array was non-uniform.

The light extraction structure array comprised aspheres (paraboloids having a base radius of 40 microns and a height of 8 microns) and truncated aspheres. There were 3 regions of light extraction structures, each region having a different areal density (which increased with increasing distance from the LED) and shape factor (height and/or geometric configuration). Each region was a 10 millimeter (mm) square. On a global coordinate system, using an (X,Y) coordinate space, the lower righthand corner of Region 1 was located at (15 mm, −5 mm), the lower righthand corner of Region 2 was located at (5 mm, −5 mm), and the lower righthand corner of Region 3 was located at (−5 mm, −5 mm). The source LED was located at (20 mm, 0 mm), with emission in the negative X direction.

The height of the light extraction structures (truncated aspheres) in Region 1 was 5 microns and in Region 2 was 6 microns. There was no truncation of the light extraction structures (aspheres) in Region 3.

The areal density of each region of the resulting array can be described by a uniform spacing ($s_y$) between light extraction structures in the Y direction and a non-uniform spacing ($s_{xi}$) between light extraction structures (i+1) and (i) in the X direction, which varied according to the formula $s_{x(i)} = s_y((i+1)^p - i^p)$ where i is the number of the light extraction structure (beginning with the number 0 for the first structure located at the righthand side of the region and incrementing by one for each structure to the left of it thereafter). Region 1 had $s_y$=555 micrometers and p=0.6542; Region 2 had $s_y$=263 micrometers and p=0.7948; and Region 3 had $s_y$=149 micrometers and p=0.8948.

Following imaging on the two-photon laser scanner, the photosensitive material was cured at 95 degrees C. for 15 minutes. The resulting cured array was subsequently developed using MicroChem SU-8 developer for approximately 10 minutes and dried to form a master tool.

A silicone (GE RTV 615 2-part silicone, General Electric Co, Waterford, N.Y.) was cast on the master tool, which had sandblasting tape arranged around the light extraction structure array to form a dam about 3 mm thick corresponding to the outline of a final lightguide. The silicone was degassed in a vacuum oven for 15 minutes, a release liner was added on top of the silicone, and the silicone was cured at 80° C. for 1½ hours. The silicone was removed from the master tool to form a daughter tool. A dam about 3 mm high was constructed around the silicone daughter tool using sandblasting tape, and an ultraviolet (UV) curable acrylate (Photomer 6210, Cognis, Cincinnati, Ohio) was poured over the silicone daughter tool and degassed 15 minutes in a vacuum oven at 50° C. The degassed construction was covered with a release liner and cured by passing under a UV light (H bulb, Fusion UV Systems, Gaithersburg, Md.) 5 times at 12 centimeters per second (24 feet/minute). The resulting cured acrylate was separated from the silicone to form a microreplication tool. A dam was formed around the microreplication tool using sandblasting tape (about 2 mm), and the tool was filled with a silicone (GE RTV 615 2-part silicone). The silicone was degassed for 15 minutes in a vacuum oven, covered with a film, and cured for 1½ hours at 80° C. The resulting cured silicone was removed from the tool to form a silicone lightguide (refractive index of 1.41) with light extraction structures (aspheres and truncated aspheres) patterned into one side. The lightguide edges were at X=−20 mm, X=20 mm, Y=−30 mm, and Y=30 mm, with reference to the above-described coordinate system. The base of each aspherical light extraction structure was located on the bottom surface of the lightguide, and the asphere extended into the lightguide by the amount of its height. The truncated aspherical light extraction structures comprised aspheres whose extension into the lightguide was terminated by a plane parallel to the asphere base.

The silicone lightguide was placed on a white sheet of paper (to reflect light refracted downward out of the light extraction structures back into the lightguide) and was coupled with a single white LED connected to a power supply. The lightguide was viewed from its top surface and showed relatively uniform light intensity with essentially no bright spots (as observed by eye) across all regions.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only.

We claim:

1. A process comprising
   (a) providing a photoreactive composition, said photoreactive composition comprising
      (1) at least one reactive species that is capable of undergoing an acid- or radical-initiated chemical reaction, and
      (2) at least one multiphoton photoinitiator system; and
   (b) imagewise exposing at least a portion of said composition to light sufficient to cause simultaneous absorption of at least two photons, thereby inducing at least one acid- or radical-initiated chemical reaction where said composition is exposed to the light, said imagewise exposing being carried out in a pattern that is effective to define at least the surface of an array of light extraction structures, each said light extraction structure having at least one shape factor, and said array of light extraction structures having a distribution that is uniform or non-uniform;
   wherein said imagewise exposing is carried out by scanning at least the perimeter of a plurality of planar slices of a desired three-dimensional light extraction structure, while controlling slice thickness so as to achieve a light extraction structure surface roughness of less than the slice thickness.

2. The process of claim 1, wherein said process further comprises developing said composition by removing the resulting exposed portion, or the resulting non-exposed portion, of said composition.

3. The process of claim 1, wherein, after imagewise exposing at least a portion of said composition, said process further comprises nonimagewise exposing at least a portion of said composition to light sufficient to effect reaction of at least a portion of any remaining unreacted photoreactive composition.

4. The process of claim 1, wherein said shape factor is selected from height, length, width, and geometric configuration.

5. The process of claim 1, wherein at least one said shape factor of at least one said light extraction structure is different from the corresponding shape factor of at least one other said light extraction structure.

6. The process of claim 1, wherein said distribution is non-uniform.

7. The process of claim 1, wherein said distribution is non-uniform, and wherein at least one said shape factor varies across said array.

8. The process of claim 1, wherein the areal density of said array of light extraction structures varies across said array and/or at least one shape factor varies across said array.

9. The process of claim 1, wherein at least a majority of said light extraction structures have a height of less than 300 microns, a length or width of less than 500 microns, and an average surface roughness of less than half the operating wavelength.

10. The process of claim 1, wherein said array has a fill factor in the range of 5 to 75 percent.

11. The process of claim 1, wherein at least two said light extraction structures have non-parallel principal axes.

12. The process of claim 1, wherein said reactive species is a curable species.

13. The process of claim 1, wherein said reactive species is a non-curable species.

14. The process of claim 1, wherein said multiphoton photoinitiator system comprises photochemically effective amounts of
   (a) at least one multiphoton photosensitizer that is capable of simultaneously absorbing at least two photons;
   (b) optionally, at least one electron donor compound different from said multiphoton photosensitizer and capable of donating an electron to an electronic excited state of said photosensitizer; and
   (c) at least one photoinitiator that is capable of being photosensitized by accepting an electron from an electronic excited state of said photosensitizer, resulting in the formation of at least one free radical and/or acid.

15. The process of claim 1, wherein said process comprises providing said photoreactive composition on a substrate and locating the interface between said composition and said substrate.

16. The process of claim 1, wherein said controlling slice thickness comprises varying slice thickness.

17. The process of claim 1, wherein said process comprises a nonimagewise exposure that is carried out using a one-photon process.

18. The process of claim 1, wherein said array comprises a masterform, and said masterform is used to fabricate a tool for replication.

19. A process comprising
   (a) providing a photoreactive composition, said photoreactive composition comprising
      (1) at least one curable species that is capable of undergoing an acid- or radical-initiated chemical reaction, and
      (2) at least one multiphoton photoinitiator system comprising photochemically effective amounts of
         (i) a multiphoton photosensitizer having a two-photon absorption cross-section greater than that of fluorescein;

(ii) optionally, at least one electron donor selected from alkylarylborate salts, tertiary aromatic alkylamines, and mixtures thereof; and (iii) at least one photoinitiator selected from iodonium salts, sulfonium salts, and mixtures thereof;

(b) imagewise exposing at least a portion of said composition to light sufficient to cause simultaneous absorption of at least two photons, thereby inducing at least one acid-or radical-initiated chemical reaction where said composition is exposed to the light, said imagewise exposing being carried out in a pattern that is effective to define at least the surface of an array of light extraction structures, each said light extraction structure having at least one shape factor selected from height, length, width, and geometric configuration, said array of light extraction structures having a distribution that is non-uniform, and said array of light extraction structures exhibiting a variation of areal density and/or at least one said shape factor across said array; and (c) developing said composition by removing at least a portion of the resulting non-exposed portion of said composition;

wherein said imagewise exposing is carried out by scanning at least the perimeter of a plurality of planar slices of a desired three-dimensional light extraction structure, while controlling slice thickness so as to achieve a light extraction structure surface roughness of less than the slice thickness.

20. A light extraction structure array comprising a plurality of light extraction structures having a non-uniform distribution, each said light extraction structure having a principal axis and at least one shape factor, and said plurality of light extraction structures exhibiting a variation in areal density, in at least one said shape factor, and in said principal axis across said plurality; wherein at least a majority of said light extraction structures have an average surface roughness of less than half the operating wavelength.

21. A light extraction structure array comprising a plurality of light extraction structures having a non-uniform distribution, each said light extraction structure having a geometric configuration, and said geometric configuration of at least one said light extraction structure being a truncated asphere.

22. A light guide comprising the light extraction structure array of claim 20.

23. A light guide comprising the light extraction structure array of claim 21.

24. An optical device comprising the light guide of claim 22.

25. An optical device comprising the light guide of claim 23.

* * * * *

UNITED STATES PATENT AND TRADEMARK OFFICE
CERTIFICATE OF CORRECTION

PATENT NO. : 7,941,013 B2
APPLICATION NO. : 12/299955
DATED : May 10, 2011
INVENTOR(S) : Charles Arthur Marttila Page 1 of 1

It is certified that error appears in the above-identified patent and that said Letters Patent is hereby corrected as shown below:

Column 7
Line 8, delete "novolak" and insert in place thereof --novolac--.

Column 9
Line 33, delete "3',6'"" and insert in place thereof --3', 6'--.

Column 24
Line 64, after "like" insert --.--.

Signed and Sealed this
Twenty-third Day of August, 2011

David J. Kappos
*Director of the United States Patent and Trademark Office*